US012676050B2

(12) United States Patent
Ravi Singaravelu et al.

(10) Patent No.: US 12,676,050 B2
(45) Date of Patent: Jul. 7, 2026

(54) SYSTEMS AND METHODS FOR VOLUNTARILY PROVIDING BIOMETRIC DATA FOR ANONYMOUS PLAYER TRACKING

(71) Applicant: LNW Gaming, Inc., Las Vegas, NV (US)

(72) Inventors: Praveen Kumar Ravi Singaravelu, Henderson, NV (US); Prashanth Raghavan, Henderson, NV (US); Sushmitha Babu, Karur (IN); Subbiah Shanmugam, Chennai (IN); Shubham Verma, Karnataka (IN); Srihari Raman, Chennai (IN); Gururaj Raibagi, Karnataka (IN); Saranya Thiagarajan, Chennai (IN); Kumar Vittoba, Bangalore (IN); Gowrishankar Periyasamy, Alpharetta, GA (US); Senthil Rajakkannu, Pudukkottai (IN); Paul Thilak Arumugam, Alpharetta, GA (US); Karthicksundar Kumarasamy, Pollachi (IN); Mohammed Faiz Alam, Jharkhand (IN); Felicita Silvester, Milton, GA (US); Palani Sankar Ramalingam, Pleasanton, CA (US); Samudhiram Lakshmipathy, Chennai (IN); Ameena Bathool, Chennai (IN); Janani Kamaraj, Chennai (IN); Praveen Kumar Kumar, Dharmapuri (IN); Balram Ravi, Dindigul (IN); Sharath Senbagaraman, Tamil Nadu (IN); Rajeshwari Subramanian, Chennai (IN); Brinda Uganathan, Chennai (IN); Naga Sudharsana Reddy Gujjala, Henderson, NV (US); Manjari Sapre, Henderson, NV (US); Jeffrey Hantin, Boulder City, NV (US); Michaelraj Chinnakani, Chennai (IN); Lakshmi Priya Muralidharan, Chennai (IN); Sangeetha Chandrasekar, Chennai (IN); Ajay Chandrasekaran, Sivagangai (IN); Kumar Veeraiyan, Chennai (IN); Padmanaban Madhavan, Chennai (IN); Baskaran Sivanesan, Chennai (IN); Hemalatha Mummundlu, Bangalore (IN); Parameswaran Palanisamy, Namakkal (IN); Hariharan Murugan, Erode (IN); Nataraj Selvaraj, Namakkal (IN); Shine Alex Rapel Raj, Chennai (IN); Manikandan Kumaresan, Tirupur (IN); Ashish Gupta, Chennai (IN); Supraja Poonamallee Muthukumar, Chennai (IN); Aadharsh Babu, Thiruvannamalai (IN)

(73) Assignee: LNW Gaming, Inc., Las Vegas, NV (US)

( * ) Notice: Subject to any disclaimer, the term of this patent is extended or adjusted under 35 U.S.C. 154(b) by 292 days.

(21) Appl. No.: 18/319,753

(22) Filed: May 18, 2023

(65) Prior Publication Data

US 2024/0029508 A1 Jan. 25, 2024

Related U.S. Application Data

(60) Provisional application No. 63/350,990, filed on Jun. 10, 2022.

(51) Int. Cl.
*G07F 17/32* (2006.01)

(52) U.S. Cl.
CPC ...... *G07F 17/3239* (2013.01); *G07F 17/3206* (2013.01); *G07F 17/3211* (2013.01); *G07F 17/3223* (2013.01); *G07F 17/3241* (2013.01)

(58) Field of Classification Search
CPC ............ G07F 17/3239; G07F 17/3206; G07F 17/3241
See application file for complete search history.

(56) References Cited

U.S. PATENT DOCUMENTS

| | | | | |
|---|---|---|---|---|
| 2,020,003 | A * | 11/1935 | Sloane | E21C 31/10 299/71 |
| 5,763,837 | A | 6/1998 | Davignon et al. | |

(Continued)

*Primary Examiner* — Jasson H Yoo

(57) ABSTRACT

Disclosed are methods of operating a casino gaming system to establish a play session for an anonymous player in which the player voluntarily provides biometric information to link the player to a player tracking record in a database of the system. In some embodiments, the player grants permission for a camera integrated into an electronic gaming machine to capture a facial image to assist in the location of the record or creation of a new record associated with the player's biometric signature. In other embodiments, the player voluntarily uses a camera integrated into a personal electronic device, such as the player's smartphone, to capture the facial image. Once the player record to be used has been identified, the record is linked to the electronic gaming machine to create a play session from which player tracking data is collected and integrated into the database record associated with the anonymous player.

12 Claims, 18 Drawing Sheets

(56) References Cited

U.S. PATENT DOCUMENTS

| | | | | |
|---|---|---|---|---|
| 5,833,540 | A | 11/1998 | Miodunski et al. | |
| 6,142,876 | A | 11/2000 | Cumbers | |
| 6,234,900 | B1 | 5/2001 | Cumbers | |
| 6,612,928 | B1 | 9/2003 | Bradford et al. | |
| 6,783,459 | B2 | 8/2004 | Cumbers | |
| 7,155,037 | B2 | 12/2006 | Nagai et al. | |
| 7,175,528 | B1 | 2/2007 | Cumbers | |
| 7,240,022 | B1 | 7/2007 | Bistriceanu et al. | |
| 7,258,272 | B2 | 8/2007 | Yoshizane et al. | |
| 7,272,247 | B2 | 9/2007 | Hamid | |
| 7,401,357 | B2 | 7/2008 | Hasegawa et al. | |
| 7,506,172 | B2 | 3/2009 | Bhakta | |
| 7,927,211 | B2 | 4/2011 | Rowe et al. | |
| 8,319,601 | B2 | 11/2012 | Gelman et al. | |
| 8,480,487 | B2 | 7/2013 | Morrow | |
| 8,510,567 | B2 | 8/2013 | Alderucci et al. | |
| 8,581,721 | B2 | 11/2013 | Asher et al. | |
| 8,597,111 | B2 | 12/2013 | Lemay et al. | |
| 8,644,564 | B1 | 2/2014 | Patton et al. | |
| 8,645,709 | B2 | 2/2014 | Alderucci et al. | |
| 8,876,595 | B2 | 11/2014 | Nelson et al. | |
| 8,876,608 | B2 | 11/2014 | Shepherd et al. | |
| 8,944,916 | B2 | 2/2015 | Abouchar et al. | |
| 9,005,013 | B2 | 4/2015 | Radisich et al. | |
| 9,022,855 | B2 | 5/2015 | Radisich et al. | |
| 9,047,617 | B2 | 6/2015 | Sanchez et al. | |
| 9,082,235 | B2 | 7/2015 | Lau et al. | |
| 9,153,095 | B2 | 10/2015 | Adiraju et al. | |
| 9,183,693 | B2 | 11/2015 | Asher et al. | |
| 9,183,701 | B2 | 11/2015 | Farrar | |
| 9,269,216 | B2 | 2/2016 | Keilwert | |
| 9,269,221 | B2 | 2/2016 | Gobbi et al. | |
| 9,411,944 | B2 | 8/2016 | Alderucci et al. | |
| 9,489,794 | B2 | 11/2016 | Hilbert et al. | |
| 9,563,898 | B2 | 2/2017 | Mcmahan et al. | |
| 9,659,442 | B2 | 5/2017 | Acres | |
| 9,704,174 | B1 | 7/2017 | Mcghie et al. | |
| 9,875,607 | B2 | 1/2018 | Nelson et al. | |
| 9,892,592 | B2 | 2/2018 | Finnimore | |
| 10,475,280 | B2 | 11/2019 | Dabrowski | |
| 10,741,020 | B1 | 8/2020 | Thoeni et al. | |
| 10,769,887 | B2 | 9/2020 | Soukup et al. | |
| 10,792,570 | B2 | 10/2020 | Russ et al. | |
| 10,878,657 | B2 | 12/2020 | Soukup et al. | |
| 10,909,798 | B2 | 2/2021 | Dabrowski | |
| 11,113,926 | B2 | 9/2021 | Miri et al. | |
| 11,127,247 | B2 | 9/2021 | Jin et al. | |
| 11,151,844 | B2 | 10/2021 | Nelson et al. | |
| 11,238,695 | B2 | 2/2022 | Moore et al. | |
| 11,393,282 | B2 | 7/2022 | Bucher et al. | |
| 11,495,087 | B2 | 11/2022 | Dabrowski | |
| 11,521,460 | B2 | 12/2022 | Soukup et al. | |
| 2003/0027631 | A1 | 2/2003 | Hedrick et al. | |
| 2003/0028480 | A1 | 2/2003 | Rowe | |
| 2003/0032474 | A1 | 2/2003 | Kaminkow | |
| 2003/0054868 | A1 | 3/2003 | Paulsen et al. | |
| 2003/0054878 | A1 | 3/2003 | Benoy et al. | |
| 2004/0002386 | A1 | 1/2004 | Wolfe et al. | |
| 2005/0159214 | A1 | 7/2005 | Rohde et al. | |
| 2006/0189382 | A1 | 8/2006 | Muir et al. | |
| 2007/0009139 | A1 | 1/2007 | Landschaft et al. | |
| 2007/0086626 | A1 | 4/2007 | Mariani et al. | |
| 2007/0117623 | A1 | 5/2007 | Nelson et al. | |
| 2007/0213124 | A1 | 9/2007 | Walker et al. | |
| 2008/0192980 | A1 | 8/2008 | Park et al. | |
| 2008/0214295 | A1 | 9/2008 | Dabrowski | |
| 2008/0214310 | A1 | 9/2008 | Brunet De Courssou et al. | |
| 2009/0092294 | A1 | 4/2009 | Uchida | |
| 2009/0110248 | A1 | 4/2009 | Masuda et al. | |
| 2009/0124354 | A1 | 5/2009 | Acres | |
| 2009/0124376 | A1 | 5/2009 | Kelly et al. | |
| 2009/0176566 | A1 | 7/2009 | Kelly | |
| 2009/0183243 | A1 | 7/2009 | Ruppert et al. | |
| 2009/0251560 | A1 | 10/2009 | Azar et al. | |
| 2009/0275399 | A1 | 11/2009 | Kelly et al. | |
| 2009/0275401 | A1 | 11/2009 | Allen et al. | |
| 2009/0285454 | A1 | 11/2009 | Xu | |
| 2010/0254571 | A1 | 10/2010 | Matsuura et al. | |
| 2013/0023337 | A1 | 1/2013 | Ward et al. | |
| 2013/0137516 | A1 * | 5/2013 | Griswold | G07F 17/3218 463/43 |
| 2016/0093166 | A1 | 3/2016 | Panambur et al. | |
| 2016/0284163 | A1 * | 9/2016 | LeMay, Jr. | G07F 17/3239 |
| 2018/0122185 | A1 | 5/2018 | Miller | |
| 2020/0098223 | A1 | 3/2020 | Lyons et al. | |
| 2020/0151993 | A1 | 5/2020 | Russ et al. | |

* cited by examiner

SYSTEMS AND METHODS FOR VOLUNTARILY PROVIDING BIOMETRIC DATA FOR ANONYMOUS PLAYER TRACKING

RELATED APPLICATIONS

This patent application claims priority benefit to U.S. Provisional Patent Application No. 63/350,990 filed Jun. 10, 2022. The 63/350,990 Application is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022-2023, LNW Gaming, Inc.

FIELD OF THE INVENTION

The present invention relates generally to gaming devices, gaming systems, and related methods for player identification.

BACKGROUND OF THE INVENTION

Gaming devices and systems have previously incorporated biometric technology. For example, gaming systems use biometric technology such as an anonymous facial recognition system in connection with player bonusing. However, current casino gaming systems do not provide a voluntary biometric identification system having the features of the embodiments described herein.

SUMMARY OF THE INVENTION

Briefly and in general terms, various embodiments are directed towards devices, systems, and methods involving voluntary capture of biometric information for use in player tracking and reward systems. Disclosed are methods of operating a casino gaming system to establish a play session for an anonymous player in which the player voluntarily provides biometric information to link the player to a player tracking record in a database of the system. In some embodiments, the player grants permission for a camera integrated into an electronic gaming machine to capture a facial image to assist in the location of the player tracking record or the creation of a new player tracking record associated with the player's biometric signature. In other embodiments, the player voluntarily uses a camera integrated into a personal electronic device, such as the player's smartphone, to capture the facial image. Once the player tracking record to be used has been identified, the record is linked to the electronic gaming machine to create a play session from which player tracking data is collected and integrated into the database record associated with the anonymous player.

Features of the disclosed embodiments will become apparent from the following detailed description, taken in conjunction with the accompanying drawings.

DETAILED DESCRIPTION

Figure 1:
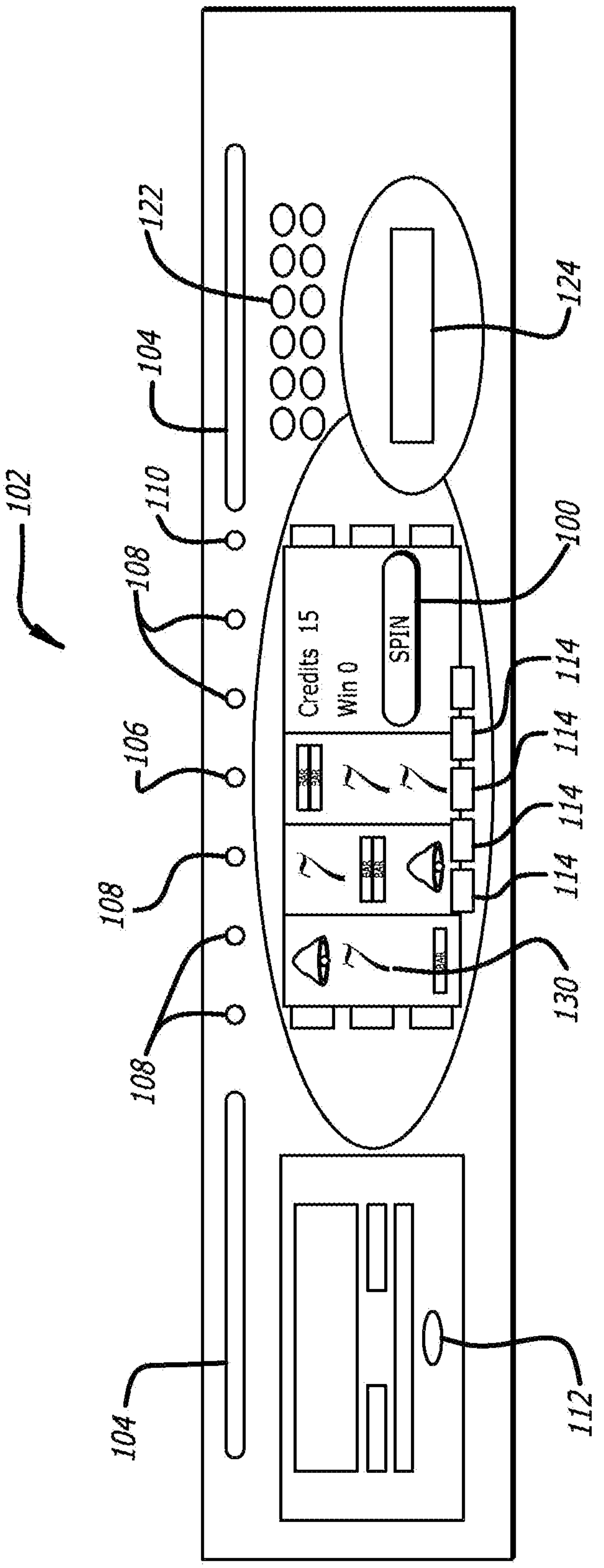
FIG. 1 is a front view of one or more embodiments of a system component panel on a gaming device used for player identification.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on smartphones (e.g., phones, tablets, etc.). When provided in a social or casual game format, the wagering game may closely resemble a traditional casino game, or it may take another form that more closely resembles other types of social/casual games. The term “casino” includes land-based casinos, racinos, and any other gaming establishments in which wagering games may be played, as well as online gaming venues such as web sites, social media applications and the like where a player’s patronage of wagering games offered therein may be tracked for various purposes.

In various embodiments, one or more electronic gaming machines (EGMs) are in communication with a tracking system component of a casino gaming system that includes one or more servers or databases connected by a network. The player tracking system allows a casino to monitor the gaming activities of various players. Additionally, the player tracking system can store data related to a player’s gaming habits. That is, a player can accrue player points that depend upon the amount and frequency of their wagers. Casinos can use these player points to compensate the loyal patronage of players. For example, casinos may award or “comp” free meals, room accommodations, tickets to shows, and invitations to casino events and promotional affairs. The player tracking system may also include a database of all qualified players (i.e., those players who have enrolled in a player rating or point accruing program). Notably, the player tracking system may also include, in its database, records associated with anonymous players (i.e., players that have not formally enrolled in the player rating or point accruing program but are still recognizable by via biometric or other voluntary anonymous player input). The capture and use of voluntarily provided biometric data, as disclosed herein, may provide player tracking benefits for a player who has never officially identified themselves and registered with the casino’s player club and created a player account. Additionally, the casino may track and market to players who are not members of the player’s club. As those skilled in the art will appreciate, the anonymous biometrically recognized player tracking data may be used independent of, or integrated with, the player tracking data of identified qualified players.

Typically, the player tracking system is operatively connected to one or more input components at the EGMs. These input components include, but are not limited to, a slot for receiving a player tracking card, a keypad or equivalent, an electronic button receptor, a touchscreen, and the like. In accordance with one or more embodiments, biometric data related to an anonymous player who is not yet a qualified player (“the Player”) may be voluntarily captured with a biometric input device incorporated into the player tracking subsystem of an EGM that the Player wishes to play (“the EGM”). For example, a camera, with player consent, may capture an image of the Player’s face. If the Player does not give permission for the image capture, the Player may play the gaming device, but no playing session will be established for the purposes of tracking the Player’s wagers, wins and losses, accruing player points, etc.

While this disclosure is primarily directed to the use of a camera as the biometric input device, in some embodiments, the biometric input device may take other forms, without limitation, such as an infrared camera, a retinal scanner, a fingerprint scanner, a voice recognition scanner, etc. In some embodiments, multiple scanners or the same or different types may be employed to gather biometric information about the Player. In any of the embodiments, multiple scans may be taken of the Player to aid in the comparison and match process. Often, an imperfect scan is acquired where certain key data points are captured in a first scan and other key data points are missing. In a second scan taken during the same identification process, other key data points are captured. The points of commonality are matched together between the two scans and the unique points are combined into a complete scan with enough data points to do a match. There may be rules that say enough good data points must be collected within a certain number of scans or the authentication/identification of the user will fail. The scanning software may decide if enough data points are found to make a biometric determination, comparison, or match. Once this determination is made, the user interface may show the Player that a good scan has occurred. In some cases, the Player may be requested to assist with the scanning process, for example, to orientate their face in a certain direction to aid in a facial recognition scan process.

In some embodiments, the EGM does not include a biometric input device like a camera or the camera at the EGM may be inoperative. The EGM may, then, allow the Player to, through back-end systems, voluntarily provide biometric information using their own device, typically via an application running on or installed on a personal computing device such as the Player’s smartphone (“the smartphone”). For example, the Player may be able to provide a live capture of their face via the smartphone camera. To enable this capability, in some embodiments, the EGM may display a QR code or similar code that the Player first captures with the smartphone camera. The operating system of the smartphone then directs its mobile web browser to a web-based application that the Player may use to take at least one photo of their face via the smartphone camera. The image is forwarded to a biometric authentication server for creation of biometric data based on the at least one image.

In other embodiments, a QR code at or displayed by the EGM and scanned by the Player instead directs the smartphone to an application store, such as the Apple® App Store® or the Google Play™ Store, from which the Player may install an application (“the mobile application”) provided by the casino or gaming system manufacturer onto the smartphone. The mobile application is then used for the purpose of capturing facial recognition data and forwarding it to the biometric authentication server. The mobile application, for example, SG Universe® by SG Gaming, Inc., may further be used to support establishment of a player tracking play session, electronic funds transfer, maintenance of a mobile wallet and the like, as will be described below.

Regardless of how the biometric authentication server acquires the facial image, it uses the facial image to create a biometric signature for use in uniquely recognizing the Player. In some embodiments, the facial image is rotated, scaled, or otherwise modified to aid in the comparison against other biometric samples. In some embodiments, the biometric authentication server may leverage the biometric processing power of a third-party service, for example, biometric cloud services provided by Amazon Web Services, Inc. The biometric signature (raw or hashed) can be sent to the biometric authentication server/database for comparison to biometric signatures (hashes, patterns, or images) stored therein. If the comparison fails, then the system will create a new anonymous account record associated with the biometric signature of the Player in the player tracking system database. If the comparison is successful, then the previously created anonymous player account record associated with the Player is used in establishing a new play session.

In some embodiments, the raw captured image is stored along with any previously captured images associated with the Player, to assist in improving the accuracy of identifying the Player in the future. In some cases, a computed value or hash of the biometric data is stored. Once the biometric signature has been computed, the value may be compared against the database to determine if a matching biometric signature was previously stored. If so, a quality rating of the new image and a quality rating of a previously stored image are compared. If the new image has a higher quality rating than the stored image's quality rating, the new image replaces the stored image, and its quality rating replaces the previous quality rating in storage. In some embodiments, the biometric signature is used to create a primary key for the Player's anonymous record in the database. Further details related to filtered capturing of a potential player's biometric information, including hardware and software details, are included in U.S. Pat. Publication 2020/0098223A1, entitled "SYSTEM AND METHOD FOR COLLECTING AND USING FILTERED FACIAL BIOMETRIC DATA," fully incorporated herein by explicit reference.

In other embodiments, the biometric data resulting from a facial image captured by the mobile application may store the biometric data on the smartphone itself and present the stored biometric data to the biometric authentication server each time the Player logs into the mobile application on the smartphone. In still other embodiments, the Player must log into the mobile application by capturing a current facial image, which is then compared to previously captured and stored biometric data on the smartphone to log into the mobile application. In some embodiments, the ability to log into the mobile application using facial recognition leverages support built into the operating system of the smartphone itself. For example, an application running on an Apple iPhone may use the Face ID® subsystem of the smartphone to authenticate the Player as the authorized user of the mobile application. Alternately, the mobile application may have its own integrated facial recognition software coupled to the camera of the smartphone. In these cases, the biometric data may not be forwarded to the biometric authentication server at all. Rather, once the Player has been authorized to use the mobile application via the smartphone's onboard biometric identification, a unique ID such as the smartphone's serial number or IMEI number may be sent to the gaming system and used to locate or establish the Player's anonymous record in the player tracking system database. This approach has the advantage of an increased sense of privacy and anonymity for the Player. Furthermore, the efficiency of the gaming system is dramatically improved because the gaming system does not have provide any programming or processing power to enjoy the benefits of anonymous biometrics.

Once an anonymous player record, pre-existing or new, has been associated with the Player, the EGM must also be identified to the system prior to establishment of a play session. If the biometric data was captured using a biometric reader incorporated into the player tracking subsystem of the EGM, the gaming device is immediately known. Otherwise, if the Player's biometric data came from the smartphone, the Player may again use the mobile application to capture, via the smartphone camera, an image of a QR code displayed by, or affixed to, the EGM. The mobile application forwards the image to the system, which identifies the EGM. In some embodiments, the mobile application, and thus, the Player, may be electronically associated with the EGM without the need for the Player to take any additional action, as will be explained further below.

Once the EGM has been identified, a playing session associating the Player's anonymous record with the EGM is established. While uniquely recognized via biometric data, the Player remains anonymous to the casino because no personal data, such as name, phone number or address, is known to the system. It should be noted that establishment of the anonymous player session is under control of the Player, as the Player actively consents to, or participates in, each step, including those steps requiring the Player to provide biometric data such as a facial scan.

Because qualified players are typically issued player cards with magnetic stripes that can be inserted into and read by a card reader to establish a playing session, the establishment of a playing session is commonly known as "carding in." Likewise, a qualified player terminates a playing session by removing their magnetic card from the card reader ("carding out"). For the purposes of this disclosure, even though the Player is anonymous, and even though the Player may not possess a physical player tracking card, any alternate means of establishing and ending play sessions described herein, for example, as described above or via a Bluetooth pairing of the smartphone with the EGM, will also be termed "card-in" and "card-out" events, respectively.

Once the Player has carded-in, information in the Player's database record and data collected during play of the EGM may be used in connection with issuing awards, bonuses, or services to the Player. That is, information collected during the playing session are added to the Player's anonymous player record. For example, the Player's average wager size, amounts of wins and losses, time spent on the gaming device and the like may be collected and stored. If this is not the first playing session established for the Player, any new information may be combined with stored information from the Player's previous playing sessions.

The combined information may be used by one or more of the servers of the system to restrict the activities of recognized anonymous problem gamblers or banned players, to restrict illegal activities such as, but not limited to, money laundering, counterfeiting, or underage gambling, or to authenticate or provide additional security measures for electronic funds transfer authorization, transaction auditing, or account-based gaming. For example, the Player's biometric data may be used, via an age check API of the biometric authentication server, for age verification of the Player prior to commencing the gaming session at the EGM. If the age check API determines that the Player is underage, the EGM associated with the intended playing session may be locked, preventing play. The biometric information may also be used to authenticate or provide additional security measures for electronic funds transfer authorization, transaction auditing, or account-based gaming.

In accordance with some embodiments, the Player may elect to move their game credits/cash from EGM to EGM by using only their biometric data, thereby eliminating the need for vouchers or tickets. For example, the Player does not need a player's club card to use a funds transfer feature of an e-wallet, such as a Unified Wallet by SG Gaming, Inc., integrated into their smartphone application. Additionally, the Player may be able to transfer cash, credit, bonus cash, bonus credits, bonus points, or restricted credits from EGM to EGM, even without a formal player account. Optionally, the Player may be asked to initially provide and then enter a personal identification number (PIN) to further secure these transactions, as will be described below.

In another embodiment, the anonymous player account information may be used to provide player-centric gaming. For example, once the Player has carded in, a game at the EGM may be reconfigured according to the Player's previously established and stored preferences. The following are some non-limiting examples of configurations and/or downloads that may be reconfigured upon biometric identification of a player. For example, the gaming device may be reconfigured to present the Player's favorite games, luckiest games, the game with the longest play time, tournament games, or any combination thereof. The gaming device may be configured according to the Player's favorite game themes, preferred denominations, favorite group of games, favorite game combinations, favorite progressive games, favorite group play games, or any combination thereof.

In another embodiment, the Player's game state or game data may have been stored in their anonymous database record. The game state or game data may be retrieved by the Player when a play session for the same game is established. Game state features that may be saved include game specific settings, levels, objects, XML data, and/or game variables. The progress of a game (i.e., game state) may be restored and game play may continue the same or a different EGM.

For tax reasons and other privacy reasons, the Player may not want to have a player tracking card that positively identifies the Player and associates all gaming sessions' wagers and wins together. Voluntary anonymous biometric scanning is, thus, useful to the Player because the Player can be recognizable to the system but remain largely anonymous. The Player gets the benefit of their history of play, their player preferences, and their demographic profile without revealing their identify to the casino. However, in accordance with some embodiments, the system may encourage the Player to become a qualified player, that is, to formally enroll in the Player tracking club operated by the casino.

In accordance with some embodiments, the Player may be informed that, while the Player may accumulate "points" for their play during their playing sessions, they cannot use them unless the Player converts to qualified player status. In some embodiments, the Player may be offered other incentives to join the Player club as a non-anonymous qualified player. For example, the mobile application may offer the Player $50 in free play if they sign up for the Player club. In other embodiments, to encourage the Player to at least continue to identify themself to the system anonymously and to experience, at some level, the benefits of participation in the Player club, the system may provide, through an electronic bonusing subsystem (EBS), a promotional server or the like, periodic small credit awards or other benefits, such as a free meal or entertainment in the gaming establishment.

In some embodiments, a geofence may be established around the gaming establishment. If the Player already has the mobile application installed on their smartphone, the mobile application may automatically launch when the Player enters the gaming establishment and new incentives to play or to join the Player club may be offered to the Player, for example, through a push notification. Such advertisements, offers and bonuses may be tracked and associated specifically with the Player. Certain non-limiting examples include an advertisement or offer that has been previously shown to the Player would be or not be shown again, an offer that was previously accepted would be or not be shown again, or a bonus that was already given to the Player would be or not be given again. Based on the Player's biometric data, advertisements and game offers may also be determined by identified demographics of the Player. For example, the Player may be offered a list of games that are typically preferred by their demographic group.

While benefits associated with play statistics credited to the Player may not be redeemable until the Player is persuaded to reveal their identify through joining of the Player's club, it is also contemplated that the Player may be "comped" (i.e., compensated) and bonused in the same ways as if the Player had registered for a qualified player account. A non-limiting example is where a Power Winners progressive is configured for anonymous players who have played over $500 of wagers in the last month. If the system determines that the Player meets the progressive criteria, the Player is then qualified for entry into this progressive bonus in the event the progressive bonus is triggered. In another example, the Player may earn "Live Rewards" bonus games and play points as if the Player was a qualified player. As with fully qualified players, comps or bonuses accrue over multiple play sessions once the system determines that the Player is a same player from previous sessions.

In some embodiments, like qualified players, anonymous players can be grouped into different club levels. For example, silver, gold, and platinum club levels are traditionally defined for casino registered players who hold a magnetic stripe player card. Players who reach certain club level statuses are given extra or different bonusing based upon these club levels. The Player may also be linked into these same or different club levels, with or without the Player's knowledge. The Player may advance from one club level to the next based upon wagering activity in a single or multiple gaming sessions. Bonusing provided to the Player may be further modified by the EGM being played. One or more features of the EGM that may affect the bonusing include, but are not limited to, EGM ID, selected denomination, game ID, game combo ID, location, zone of the floor, the country-state-or local jurisdiction of the EGM, the property ID, a group of EGMs to which the EGM belongs, geographic location, IP address, or other players playing the same game. The bonusing rates for anonymously identified players can be configured by casino personnel in the player tracking servers.

In accordance with additional embodiments directed toward conversion of the Player to fully qualified status, dispatch software, for example, Live View by SG Gaming, Inc., may notify the casino that the Player is playing the EGM. A casino employee can then greet the Player at the EGM and offer to issue a traditional player card to the Player. The Player may also voluntarily enroll in the players' club at a players' club desk. In either case, the Player may upgrade to a fully qualified, non-anonymous, account by providing identification like a driver's license and a facial scan. In accordance with one or more embodiments, the Player may be able to provide adequate identification via the mobile application, for example, by supplying a facial scan and a photo of their driver's license or other identification documents. The Player's new facial scan will be compared to the database of biometric scans of anonymous players. If the Player's anonymous record is found, the Player's anonymous record may be converted to a fully qualified record, retaining the Player's biometric data and some, or all, of the Player's play, game state, preference, and promotional tracking data. The Player may then be given a player card for optional use in establishing future play sessions. In some embodiments, a new record is created with some, or all, of the Player's data copied into the new record and the Player's anonymous database record is deactivated.

Further details related to bonusing systems including a rewards server, a gaming or slot accounting server, and player tracking systems and servers are included in U.S. Pat. No. 9,466,170, entitled "NETWORKED GAMING SYSTEM COMMUNICATION PROTOCOLS AND METHODS," fully incorporated herein by explicit reference.

The above embodiments and others are illustrated and described herein, by way of example only, and not by way of limitation. Referring now to the drawings, and more particularly to FIGS. 1-20, there are shown illustrative examples of voluntary uses of biometric input devices to facilitate recognition of an anonymous unqualified player and the establishment of a play session for that player for player tracking purposes.

FIG. 1 illustrates a front view of one embodiment of a biometric input device incorporated into a system component panel 102 on the EGM. In this embodiment, the biometric input device is a camera 106 for biometric facial recognition and/or image capture/surveillance purposes integrated with an iView® display 130 manufactured by SG Gaming, Inc. As shown in FIG. 1, the system component panel 102 also includes a proximity detection antenna 104 (and circuitry) and light emitting diodes (LEDs) 108 projecting visible or infrared light for facial illumination. The system component panel 102 may also include a microphone 110 for player communication to a casino help desk or other services, voice recognition and the like. As shown in FIG. 1, the system component panel 12 also includes a PIN pad 122 for password/PIN entry/feature request. The system component panel 12 may also have a player card reader 124. The player card reader 124 may be a magnetic stripe or smart card reader. Additionally, the system component panel 102 may also include a dual port, IP, serial, or USB printer 112. Optionally, the system component 102 may include a fingerprint reader (not shown) that is separate and distinct from a biometric touch screen 100. As shown in FIG. 1, soft-key buttons 114 are positioned around the display 10. The functions of the soft-key buttons 114 are presented on the display 130, and the functions of the buttons may be changed. As those skilled in the art will appreciate, the system component panel 102 may include less than all the components (or different combination of components) from that which is depicted in FIG. 1. Some or all these peripheral components may be connected to a base EGM processor board rather than the iView processing board or to a game monitoring unit (GMU).

In one embodiment, the various components of the system component panel 102 are mounted on a metal bracket (not shown) that may be fixed to the EGM. As shown in FIG. 2, these components are linked into a virtual private network of the system components in the EGM. The system components include an iView processing board 140 and a GMU processing board 142. The iView processing board 140 and the GMU 142 are connected to various systems and servers such as, but not limited to, a slot accounting system (SMS/SDS™), player tracking system (CMP™/CMS), biometric authentication servers, print servers, bonusing servers, download/configuration servers, bonus game servers (e.g., Power Rewards™ server or Power Winners™ servers), iView media servers, advertisement servers, offer servers, and other servers throughout the casino.

Figure 2A:
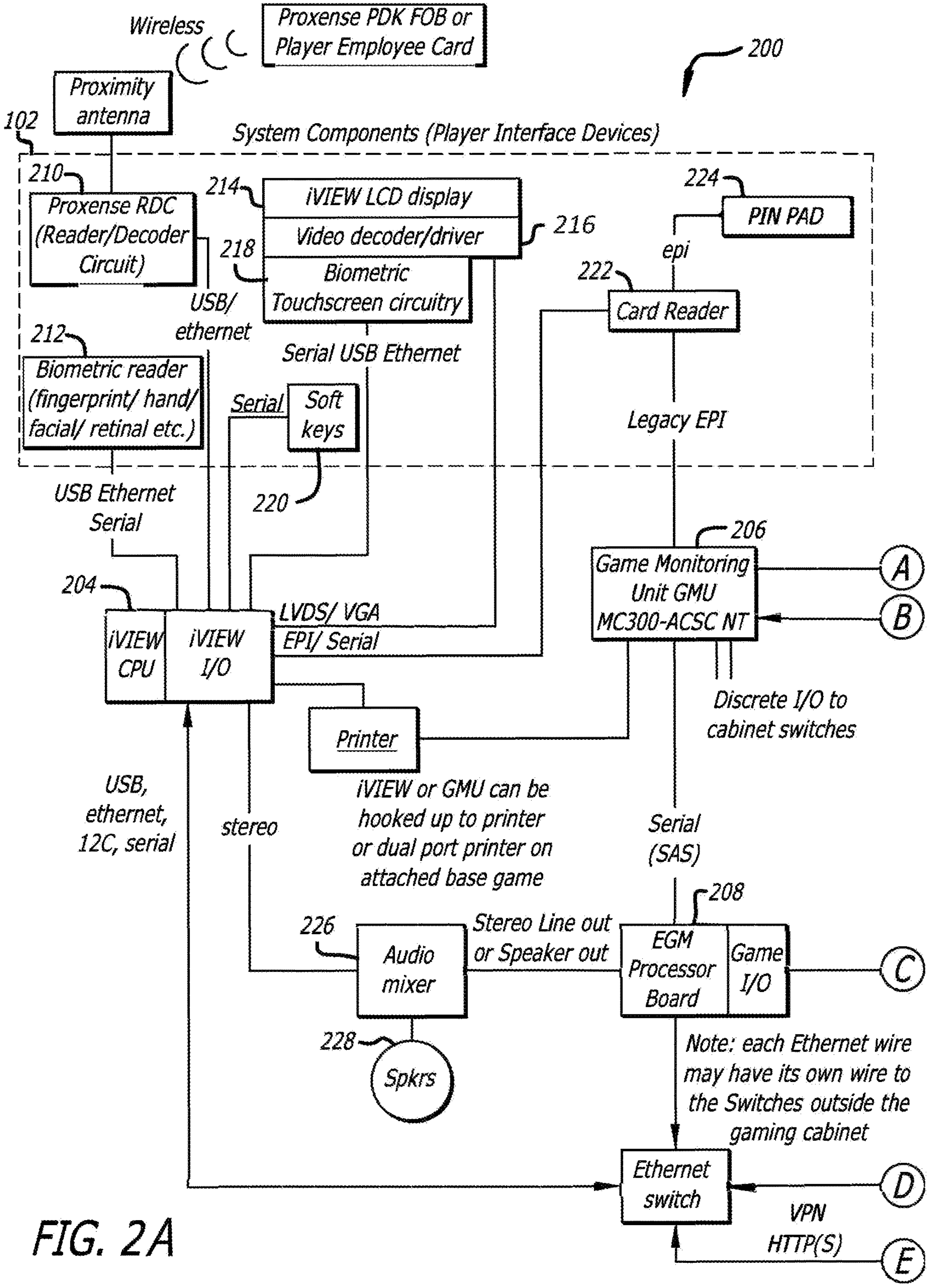
FIG. 2A and FIG. 2B is a block diagram of one or more embodiments of an electronic gaming machine (EGM) and its system components.
Figure 2B:
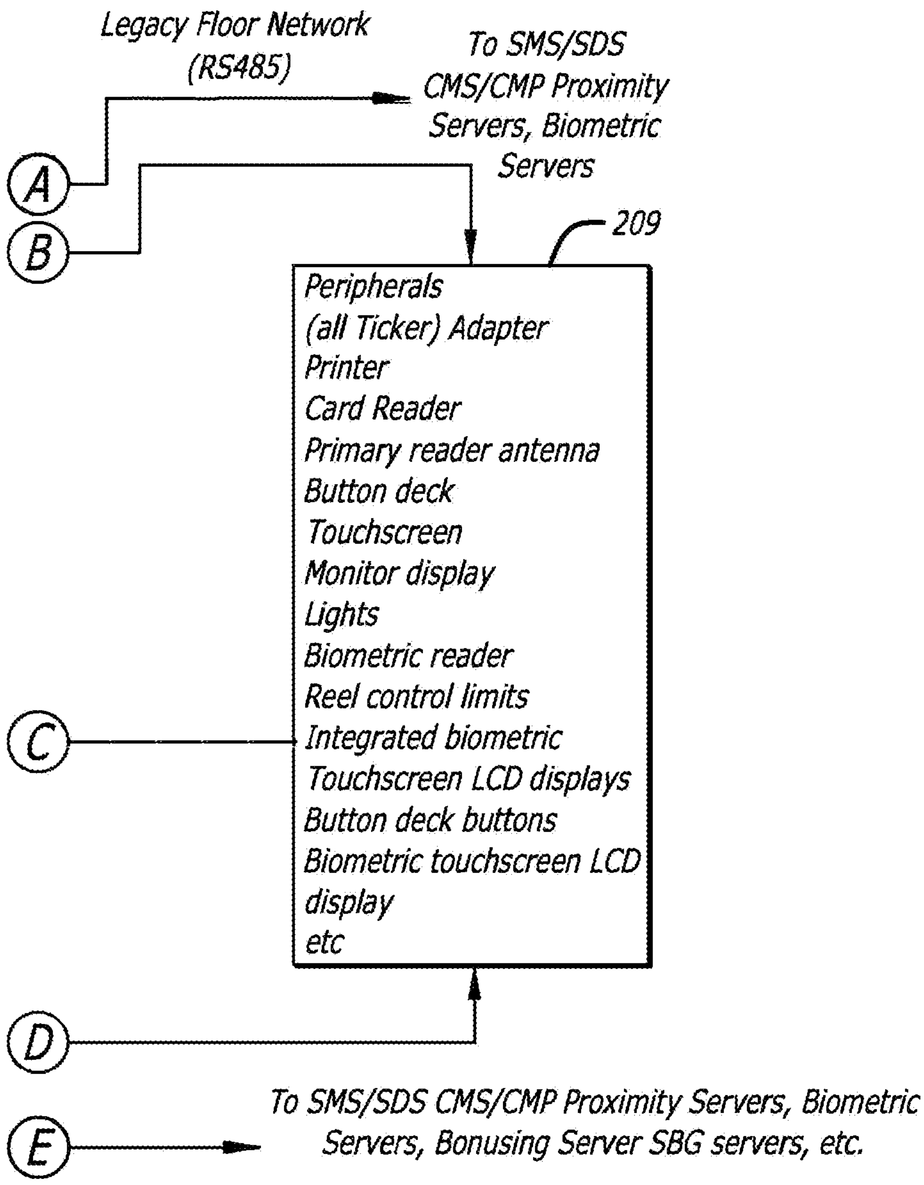

FIG. 2A and FIG. 2B illustrate one embodiment of the EGM 200 and the various components included with the EGM 200. As shown in FIG. 2A, the EGM 200 includes system component panel 102, an iView processing board 204, game monitoring unit (GMU) processing board 206, EGM processor board 208, and one or more peripherals 209 in communication with the EGM processor board. The system component panel 102 includes a proximity sensor 210 (having a reader/decoder circuitry), a biometric reader 212, a video display 214 (and associated decoder and drivers 216), a biometric touchscreen device 218, one or more soft keys 220, a card reader 222, and a PIN pad 224. As shown in FIG. 2A, the proximity sensor 210, biometric reader 212, video display 214, biometric touchscreen device 218, and one or more soft keys 220 communicate with the iView processing board 204 via USB, serial, parallel, RS485, or Ethernet connections. The card reader 222 and PIN pad 224 may communicate with the GMU via EPI protocol. Alternatively, the system components are directly IP addressable on the gaming network. The proximity sensor may be of any type, including a Bluetooth® receiver capable of determining the relative signal strength of neighboring Bluetooth devices or a passive infrared (PIR) sensor that measures infrared (IR) light radiating from players and objects within its field of view.

The EGM processing board 208 is in communication with an audio amplifier/mixer 226 (which, in turn, is in communication with speakers 228), and one or more servers in the gaming network via an Ethernet switch 230. Additionally, as shown in FIG. 2A, the EGM 208 is in communication with the iView processing board 204 and the GMU 206.

As shown in FIG. 2A, the iView processing board 204 and the GMU 206 are separate components, but the GMU and iView processing board may be combined into one device. The combined device may have video mixing technology to mix video from the EGM processor signals with a video source for the iView display to present a game, game information, bonusing, or other information on any monitor on the gaming device in a Picture in Picture (PIP) or full screen format.

The various components of the system component panel may have USB, serial, parallel, RS485, or Ethernet connections to the system components in the gaming cabinet or these components may be directly IP addressable on the gaming network. The GMU may have a connection to the base game through a serial SAS connection or optional G2S classes over Ethernet. The system components in the gaming cabinet may be connected to various servers using HTTPS over Ethernet. Firmware, media, operating systems, and configurations may be downloaded to the system components from the servers. Generally, this data is authenticated prior to installation on the system components.

Figure 3:
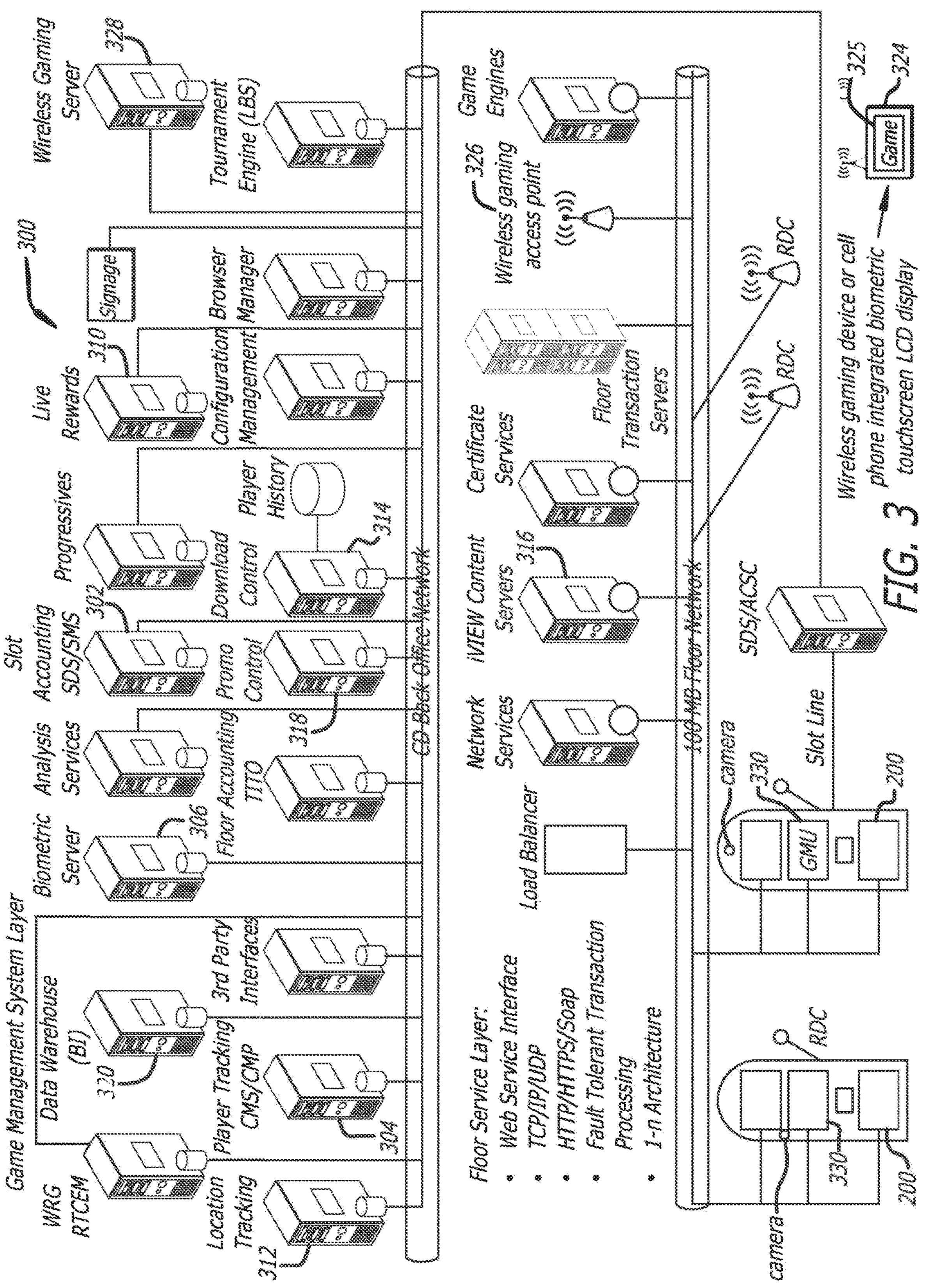
FIG. 3 is a network drawing of the various components in one or more embodiments of a casino gaming system.

FIG. 3 illustrates one embodiment of a gaming system 300 having one or more electronic gaming machines (EGMs) 200 incorporating at least one biometric input device. The electronic gaming machines 200 may be in a single casino or in multiple gaming locations. As shown in FIG. 3, the electronic gaming machines 200 are connected to the slot system (SMS/SDS) 302, player tracking system (CMP/CMS) 304, biometric authentication servers 306, print servers (not shown), bonusing servers (e.g., Live Rewards server) 310, proximity location-based tracking servers 312, download/configuration servers 314, iView media servers 316, advertisement servers 318, offer servers, responsible gaming servers and other servers throughout one or more casinos.

In one embodiment, the system components in the electronic gaming machines 200 are connected to the servers via HTTPS over Ethernet. In other embodiments, the system components are connected to the servers by any connections known or developed in the art. Firmware, media, operating systems, and configurations may be downloaded to the system components from one or more servers in the gaming system 300. Again, downloaded data is typically authenticated prior to installation on the system components.

As shown in FIG. 3, the gaming system 300 includes wireless gaming devices 324 having biometric input devices 325, network access points 326, and wireless gaming servers 328. In one embodiment, the electronic gaming machines 200 and player tracking devices (GMU) 330 have integrated biometric input devices that act as both a user interface and biometric scanner. In one or more embodiments, wireless gaming devices 324 may include smartphones having a biometric input device, for example, a camera used to obtain facial recognition data or a biometric touchscreen display or a fingerprint sensor used to collect fingerprint data. The gaming system includes a number of servers, for example, without limitation, Live Rewards server 310, Slot Accounting Server 302, Promotional Control server 318, Download Control Server 314, Biometric Server 306, Location Tracking Server 312, Player Tracking Server 304, iView Content server 316, and Data Warehouse 320.

Further details related to EGM-based capture of biometric data for the purposes of establishing a playing session, funds transfer and the like, including hardware and software details of systems capable of supporting such embodiments, are included in U.S. Pat. No. 8,972,299, entitled "METHODS FOR BIOMETRICALLY IDENTIFYING A PLAYER," and U.S. Pat. No. 8,644,564, entitled "SAFE ILLUMINATION FOR COMPUTERISED FACIAL RECOGNITION," both fully incorporated herein by explicit reference.

Figure 4:
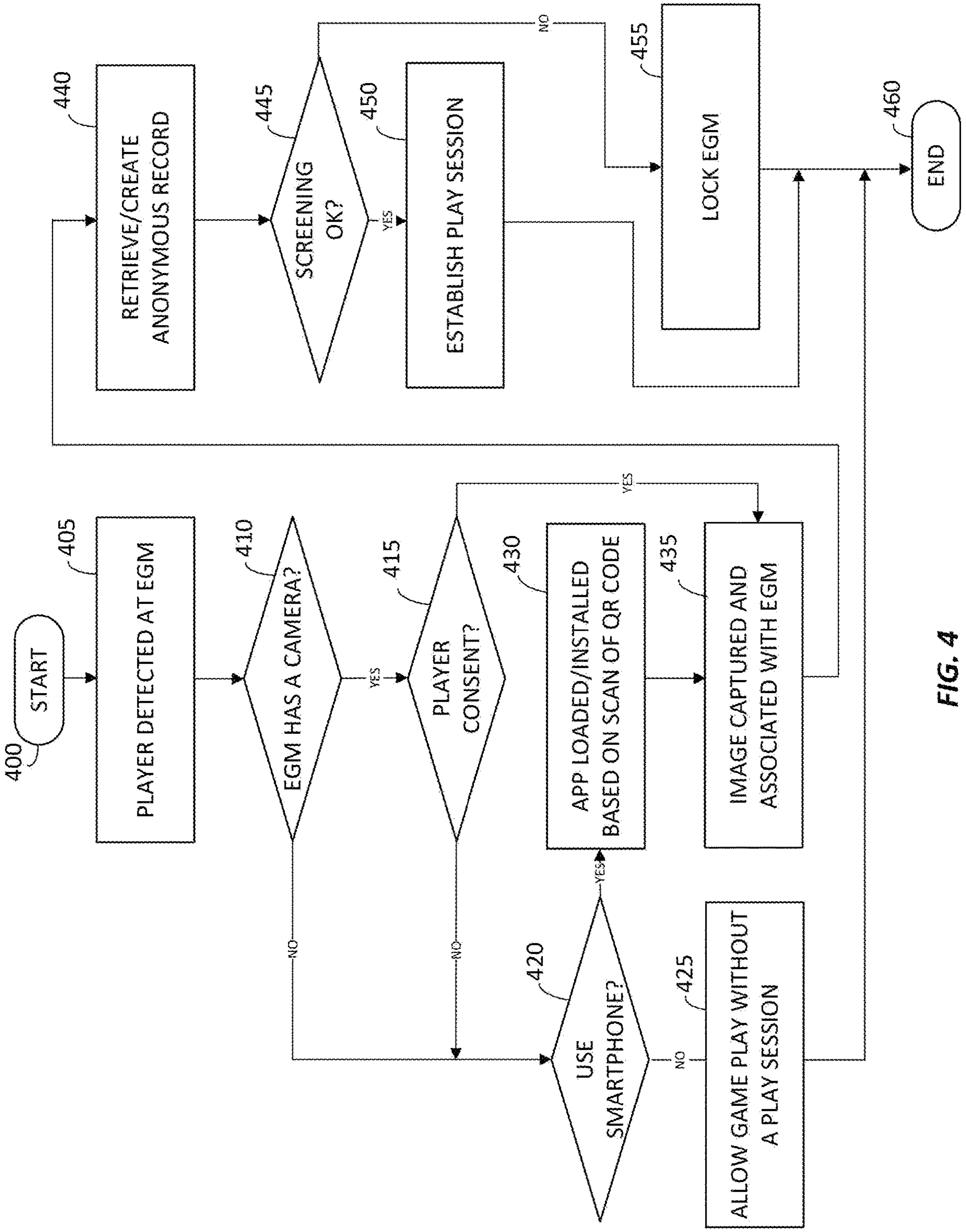
FIG. 4 is a flowchart of a multi-option voluntary biometric scan of a player to establish a play session in accordance with one or more embodiments.

FIG. 4 is a flowchart of a method 400, under control of player-tracking logic circuitry which may located in one or more components of the above-described gaming system. The method 400 provides a multi-option voluntary biometric scan of the Player to establish a play session in accordance with one or more embodiments.

At step 405, the Player is detected at the EGM, either by detection of insertion of a bill or ticket to place a credit balance on the EGM, by way of a proximity sensor, or by any other means. As described above, biometric data related to the Player may be captured, with player permission, by a camera incorporated into the player tracking subsystem of the EGM.

At step 410, it is determined whether the EGM has a camera available for this purpose. If so, permission to capture the Player's image for the purpose of establishing a play session is requested. For example, iView may display a message on its display.

If permission for the image capture is received at step 415, the player's image is captured and automatically associated with the EGM (since it captured the image) at step 435.

If, however, it is determined at step 410 that the EGM does not have a camera available to capture the Player's image or if, at step 415, permission for the image capture is not received, the Player may still elect to use the smartphone to voluntarily establish an anonymous play session. If, at step 420, the Player does not scan a QR code displayed by or at the EGM, as described above, the player tracking logic circuitry assumes that the Player does not wish to use their smartphone to establish an anonymous play session. At step 425, the attempt to establish an anonymous play session is abandoned, untracked play is allowed, and the method ends at step 460.

If, however, the Player scans the QR code at step 420, the scanned QR code launches, installs or logs the Player into the smartphone application at step 430. The Player may then capture their image at step 435, at which time one of the approaches described herein (Bluetooth, etc.) is employed to also associate the Player's smartphone, and, thus, the Player's database record, with the EGM.

The Player's record is retrieved from the database at step 440. If no record exists, a new one is created at this step. As previously described, whether gathered by the EGM camera or the Player's smartphone camera, the captured image may be used to restrict the activities of recognized anonymous problem gamblers or banned players, to restrict illegal activities such as, but not limited to, money laundering, counterfeiting, or underage gambling. A player screening, based on the Player's biometric information, is performed at step 445.

If the screening determines that the Player should be blocked, the EGM may be locked at step 455, preventing play, and casino personnel may be alerted. The method then ends at step 460. If the screening determines that play should be allowed, an anonymous play session linking the Player's record to the EGM established at step 450 and the method ends at step 460.

Figure 5:
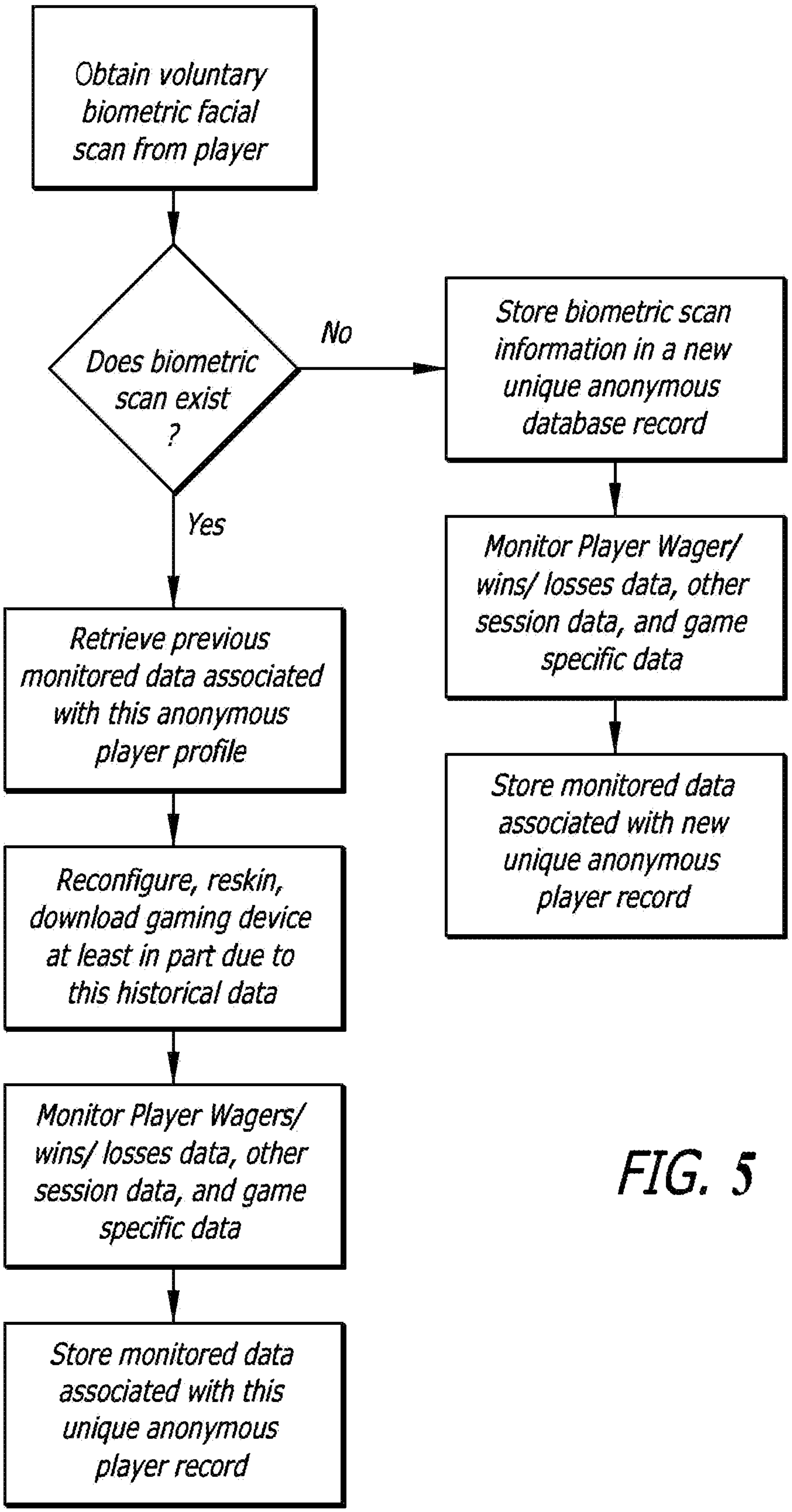
FIG. 5 is a flowchart of a player-centric reconfiguration of an EGM based upon a voluntary biometric scan of a player in accordance with one or more embodiments.

FIG. 5 illustrates a method of reconfiguring a game for the Player in accordance with one or more embodiments. As noted above, configuration of the EGM may be associated with data stored in a database record identified by biometric information voluntarily obtained from the Player. Once the Player cards in, the EGM may be reconfigured or re-skinned (i.e., changed appearance of game) based upon the Player's past game play wagers, win history, loss history, session history, previous type of game device, or other play information.

Figure 6:
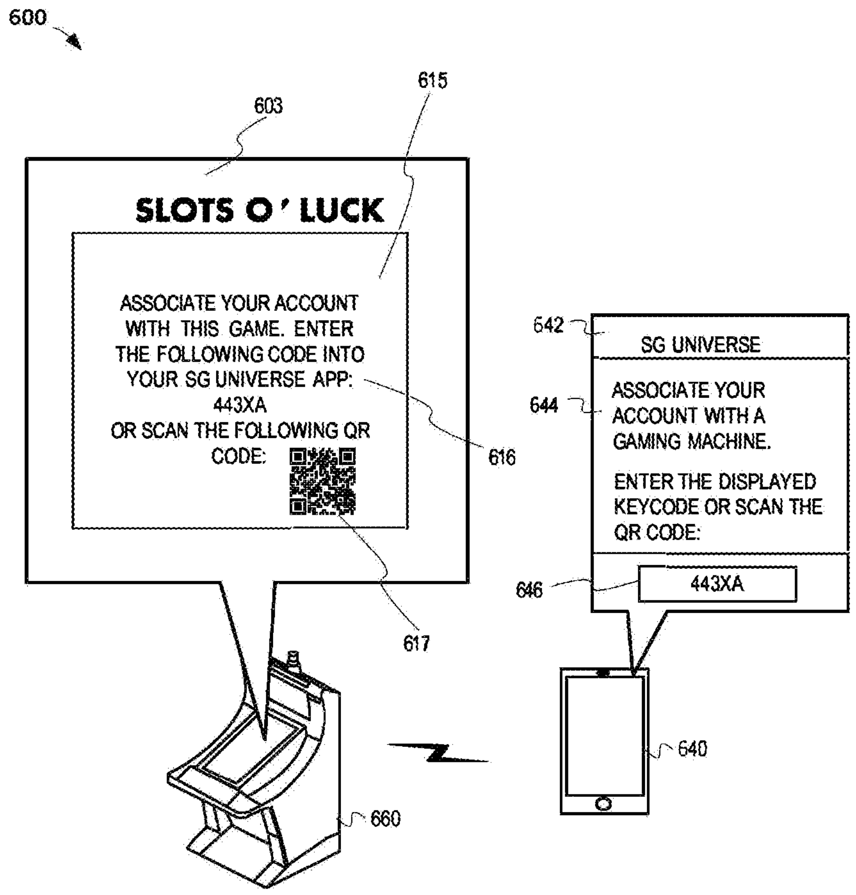
FIG. 6 is an illustration of establishing a communication link between a wagering game device and a smartphone, according to some embodiments.

Referring now to FIG. 6, in accordance with one or more embodiments, the system determines that the smartphone is associated with the EGM by the Player scanning a QR code or similar code displayed by, or attached to, the EGM via the Player's smartphone application connected to the system. In FIG. 6, a wagering game system 600 includes the EGM 660 and the smartphone 640. The EGM 660 generates a message 615 via a display. The message 615 includes instructions to open the mobile application 642 of the smartphone 640, or to view an interface 644 of an already opened instance of the mobile application 642. The interface 644 can include a message to manually enter a code 616 specified in the message 615 into a field 646 of the mobile application 642 or to scan a QR code 617 using the smartphone 640. The code 616 and/or QR code 617 is sent to the system, which associates the EGM's code with the Player's account, previously identified via the mobile application. No communication connection between the smartphone 640 and the wagering game machine 660 is required.

In other embodiments, based upon factors including the range of the smartphone 640 to the EGM 660, the system may automatically "pair" the smartphone 640 to the EGM 660 for tracking, and "unpair" the smartphone 640 and the EGM 660 to discontinue tracking. In yet another embodiment, the system may discriminate between situations where the Player is still at the EGM 660 but has re-positioned their smartphone 640 in a purse or pocket so that tracking of the Player can continue. Additionally, in another embodiment, the system may discern which one of several nearby smartphones is to be paired with the EGM 660 for tracking.

In related embodiments, the wireless technology implemented in the system is the Bluetooth standard. Bluetooth is a wireless technology standard for exchanging data over short distances (using short-wavelength UHF radio waves in the ISM band from 2.4 to 2.485 GHz) from fixed locations and smartphones. Every Bluetooth device has a unique 48-bit address, commonly abbreviated BDDR. This address is usually presented in the form of a 12-digit hexadecimal value. The most-significant half (24 bits) of the address is an organization unique identifier (OUI), which often identifies the manufacturer. The lower 24-bits are the more unique part of the address.

RSSI (received signal strength indicator) is a measurement of the power present in a received radio signal. In this context, RSSI indicates the power of the Bluetooth signal received by the receiver. Using RSSI, the wireless-enabled player-sensing and card-in system can determine how far the Bluetooth-enabled devices are from each other. In some embodiments, RSSI is responsible for successful card-in and card-out. Specific RSSI values may be determined experimentally to set threshold values for card-in and card-out. In one embodiment, the threshold for card-in and card-out are different, to overcome the issue of unintentional card-out when the Player places the smartphone in a pocket or purse while still playing at the EGM.

Creating a Bluetooth connection between two devices is a multi-step process involving three progressive states: inquiry (discovery), paging (connecting), and pairing. During the inquiry step of the connection process, if two Bluetooth devices know absolutely nothing about each other, one must run an inquiry to try to discover the other. One device sends out the inquiry request, and any device listening for such a request responds with its address, as well as possibly its name and other information. During the paging (connecting) step of the connection process, a connection is formed between two Bluetooth devices. Before this connection can be initiated, each device needs to know the address of the other (found in the inquiry process). After a device has completed the paging process, it enters the connection state. While connected, a device can either be actively participating or it can be put into a low power sleep mode. During the pairing step, when two Bluetooth devices share a special affinity for each other, they can be paired together. Paired devices automatically establish a connection whenever the devices are close enough to each other.

When devices pair up, the devices share their addresses, names, and profiles, and usually store them in memory. They also share a common secret key, which allows them to bond whenever they are together in the future. Pairing usually requires an authentication process where a user must validate the connection between devices. The pairing processes involve the entering of a common PIN code on each device. The PIN code can range in length and complexity from four numbers (e.g., "0000" or "1234") to a 16-character alphanumeric string.

Bluetooth profiles are additional protocols that build upon the basic Bluetooth standard to more clearly define what kind of data a Bluetooth module is transmitting. The one or more profiles a Bluetooth device supports define the mobile applications for which the device is intended. A hands-free Bluetooth headset, for example, uses a headset profile (HSP), while a game controller may implement the human interface device (HID) profile. For two Bluetooth devices to be compatible, they must support the same profiles. In the disclosed embodiments, the Bluetooth profile used in the card-in/card-out application may be SPP (Serial Port Profile) . SPP may be used instead of a serial communication interface (e.g., RS-232 or a UART) with Bluetooth. SPP sends bursts of data between two devices. Using SPP, each connected device sends and receives data just as if there were RX (reception) and TX (transmission) lines connected between the devices. In this embodiment, the smartphone and EGM, for example, may converse with each other during mobile payment or card-out.

Bluetooth is a packet-based protocol with a master-slave structure. The Bluetooth core specification provides for the connection of two or more devices, in which a first device plays the master role, and the other device plays the slave role. At any given time, data can be transferred between a master device and one other device. The master device chooses which slave device to address. Typically, the master device switches rapidly from one device to another in a round-robin fashion. Since it is the master device that chooses which slave device to address (whereas a slave device is (in theory) supposed to listen in each receive slot), being a master device is a lighter processor burden than being a slave device. Accordingly, being a master device of more than one slave device is possible; being a slave device of more than one master device is difficult.

An HCI provides a command interface to the baseband controller and link manager, and access to configuration parameters. For the HC-05 module, various HCI commands are used called AT-Commands. The AT-Commands being used in the disclosed embodiments of the system are mostly for putting a device into a Master/Slave Role, putting the device in Inquiry mode (AT+INQ), connecting to device (AT+ADDR), and the like.

FIGS. 7-20 illustrate various embodiments of systems and methods for smartphone card-in and card-out. Also disclosed are embodiments of systems and methods for pairing the smartphone with the EGM for providing for transfer of funds. In the disclosed embodiments, the EGM is Bluetooth-enabled with a Bluetooth module (receiver and software that supports SPP (Serial Port Profile) such as HC-05, HM-10, or HM-11.

The system further includes the smartphone that includes the hardware and processing power to run the mobile application (e.g., SG Universe) that controls the Bluetooth hardware of the smartphone to actively carry out card-in/card-out and mobile funds transfer functions. The mobile application may provide several player options, including card-in triggers, key-in methods, location-based services, and geo-location assurance. For example, by toggling the card-in triggers, the Player may enable or disable automated card-in at the EGM. Disabling automated-card-in then requires the Player to explicitly trigger the card-in process. Using key-in methods, the Player may select where to key-in (i.e., EGM or smartphone) the Player's PIN and other information during card-in. Using the option for location-based services, the Player can select a geo-location assurance option in which the smartphone provides geo-location data to the card-in server, thereby ensuring that no card-in events are allowed (presumably by another) if the Player's geo-location is not inside the casino.

Typically, a Bluetooth receiver has antennas that sense other Bluetooth devices in a 360-degree spherical radius. However, since the Player needs to be in front of, and in close proximity to, the EGM, the antenna of the EGM's Bluetooth receiver may be specially configured to receive signals from smartphones in a restricted lobe (i.e., in front of the EGM) Typically, the range of Bluetooth wireless communication is from 10 m to 100 m. However, for the card-in/card-out application, the Bluetooth range may be reduced (using the antenna and application) to a very small area around the EGM. This enables the Bluetooth hardware on the EGM to interact only with a smartphone that is very close to, and in front of, the EGM. The range of standard Bluetooth antennas is about 10 meters, and they are omnidirectional antennas. To support the card-in/card-out applications described herein, custom antennas with a shorter range and directional properties are typically used to limit range to approximately one foot and limit direction to 30 degrees (from center on either side). In one embodiment, the technical antenna design has some of the following properties: (1) Di-electric substrate: Epoxy FH4 (PCB Material), (2) Di-electric constant: 4.5, and (3) Substrate Height: 1.6 mm. Thus, the EGM contains a Bluetooth module integrated with a custom-made antenna that restricts player card-in/card-out to a small area to avoid interfering with the Bluetooth devices of other nearby EGMs.

Figure 7:
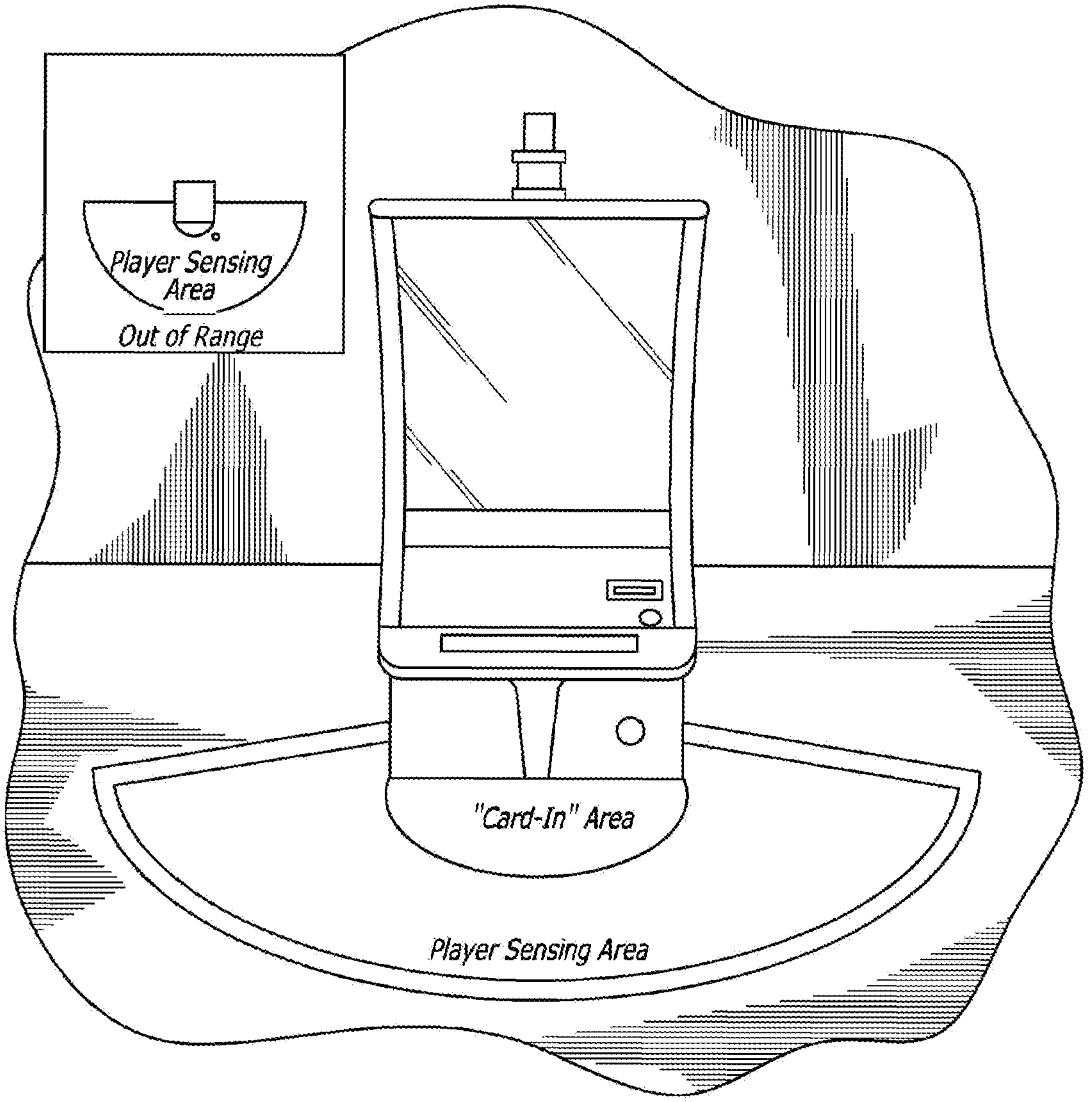
FIG. 7 illustrates a front perspective view of the player-sensing area and card-in area around an EGM in accordance with one or more embodiments.

Referring now to FIG. 7, in accordance with one or more embodiments, the area around the EGM is divided into three areas: a card-in area, a player sensing area, and an out-of-range area. The card-in-area is the area in front of the EGM. This is the area where the RSSI is the strongest. In the Bluetooth receiver of the EGM, the RSSI threshold value is configured such that the signals from smartphones brought into the card-in area are higher than the configured RSSI threshold. Only under this condition may a card-in event take place. The player sensing area is an area just outside the card-in area of the EGM. The RSSI threshold value in the EGM is configured such that the signals from smartphones brought into the player sensing area are less than the configured RSSI threshold. During this condition, the EGM can sense that the Player is in front of the EGM, but a card-in event cannot take place. The out-of-range area is an area outside of the player sensing area where Bluetooth signal strength is very weak. Accordingly, devices present in this area cannot be sensed by an EGM.

Card-in and card-out timeouts may be used to ensure intentional card-in and card-out and to avoid accidental card-in and card-out events. The card-in timeout is used to make sure that the Player is near the EGM for at least a predetermined period before they can card-in automatically. This prevents the Player from unintentionally carding in simply by walking near the EGM with no intention to play. The card-out timeout is used to make sure that the Player has exited the card-in area for at least a second predetermined period.

Since Bluetooth devices communicate with each other with one device in master mode and the other device in slave mode, there are two primary ways to carry out card-in/card-out of the Player at the EGM.

In one embodiment, the Player downloads the mobile application (SG Universe) and voluntarily and anonymously registers through the mobile application. A player ID is generated from a group of anonymous IDs allocated for this purpose. A mapping between this player ID and the Player's smartphone BDDR is kept in a record in the player tracking database. The BDDR may be stored in encrypted format to enhance security. The Player may also be asked to supply an anonymous username and PIN associated with the new record. In some embodiments, the Player may similarly register a casino desk or kiosk.

Figure 16:
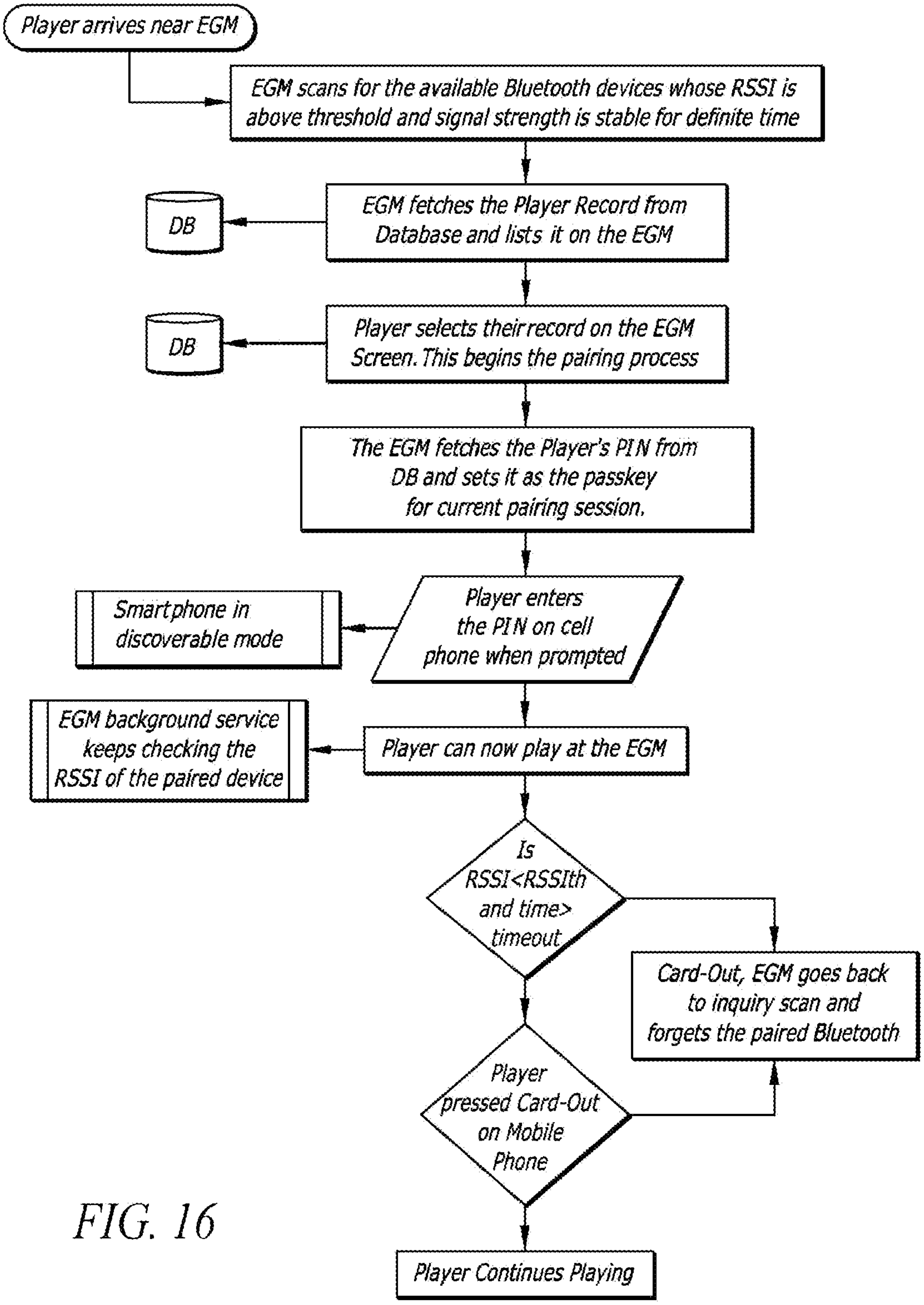
FIG. 16 illustrates a logic diagram with the EGM as the master and the smartphone as the slave in accordance with one or more embodiments.

Referring now to FIG. 16, an embodiment is shown with the EGM as the master device and the Player's smartphone as the slave device. The positive features of using this approach are that (1) the smartphone application may be lightweight since it just must place the smartphone in discoverable mode. The drawbacks of using this approach are that (1) the smartphone being in discoverable mode could be a security issue, and (2) keeping the smartphone in discoverable mode after card-in could be a hardware intensive process and may rapidly drain the smartphone's battery.

In this embodiment, the Player starts outside the Player sensing area (FIG. 7). The mobile application is either already running or the Player logs into the mobile application, voluntarily using facial recognition, as described above. Also, as previously described, the smartphone's BDDR has already been registered with the casino and assigned to the Player's anonymous record along with a PIN and a username. As the Player moves closer to the EGM, the EGM detects the presence of the Player's smartphone by receiving its BDDR address broadcast and calculates the associated RSSI. If the RSSI is strong enough for a card-in event, the EGM waits for a steady Bluetooth signal from the smartphone to doubly ensure intended card-in in case the Player is just walking past the EGM.

Figure 8:
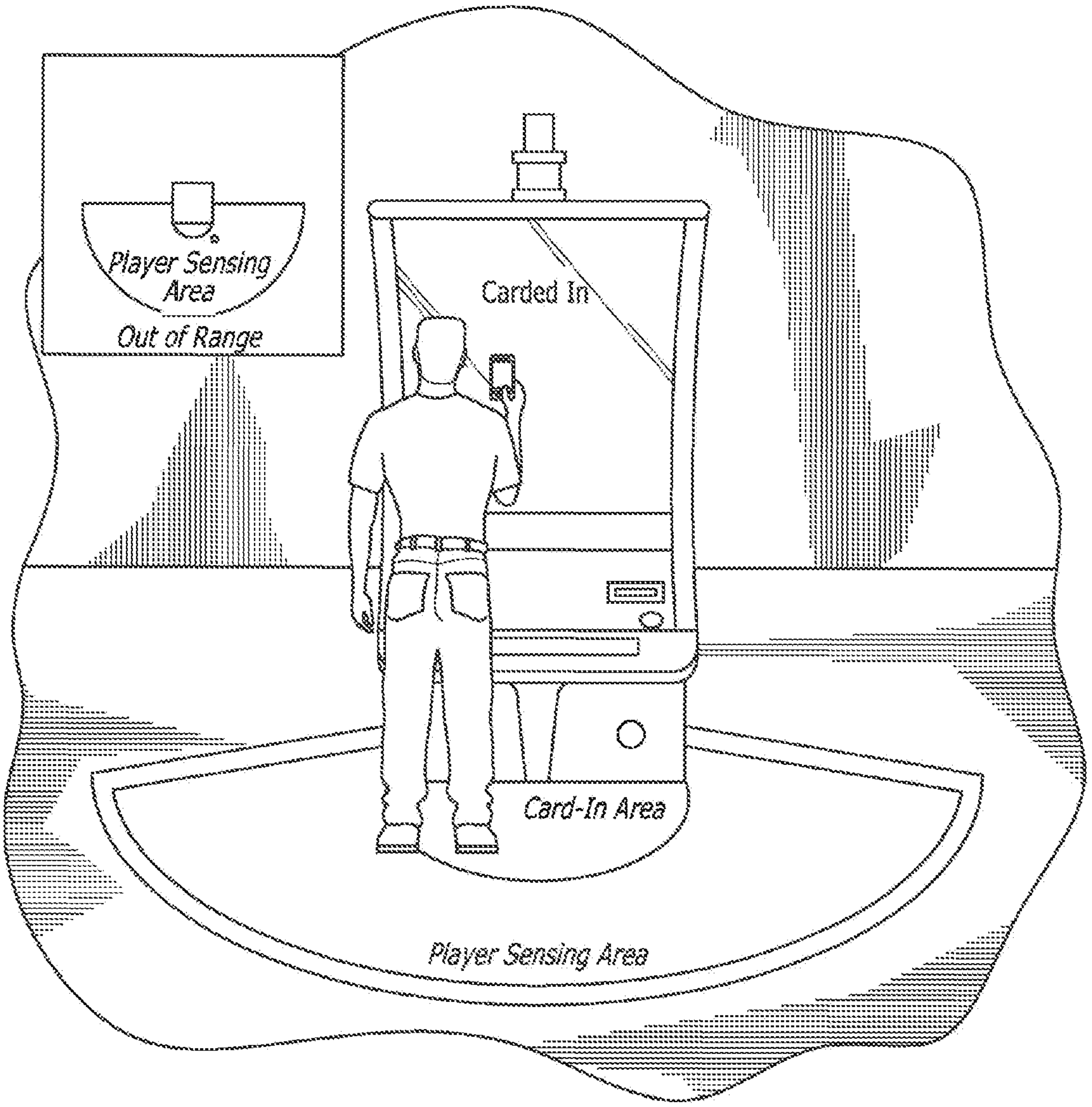
FIG. 8 illustrates a front perspective view of the player-sensing area and card-in area around an EGM with a player carding-in in accordance with one or more embodiments.
Figure 9:
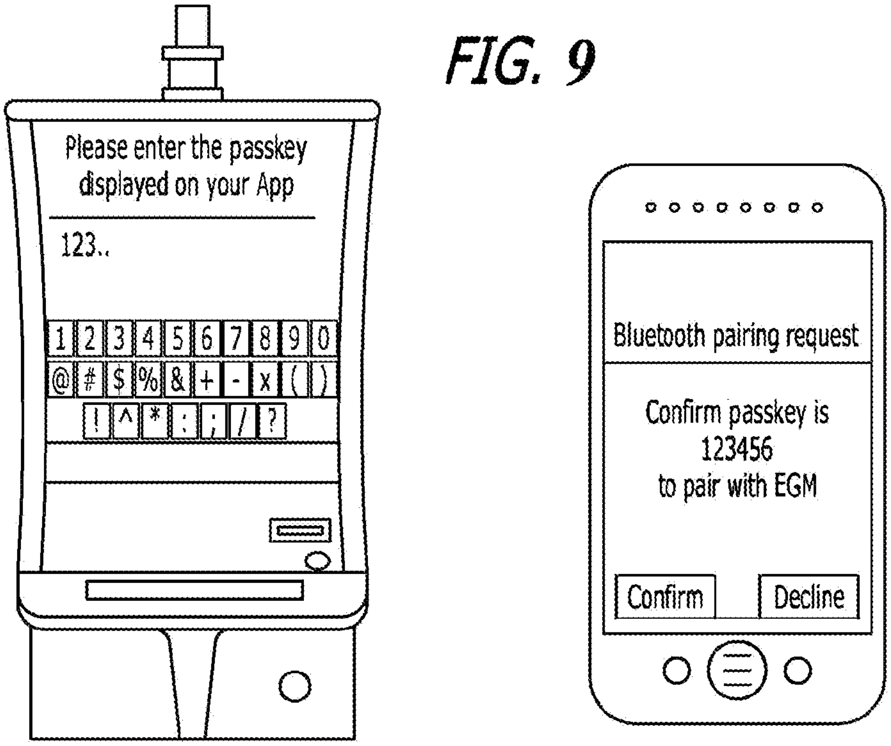
FIG. 9 illustrates a front perspective view of an EGM and a smartphone in the carding-in process with the EGM displaying a prompt for a pass-key and the smartphone displaying the passkey in accordance with one or more embodiments.

The EGM may present the Player's anonymous username on the iView display screen with a card-in button next to his identifier. If the Player presses the card-in button, the EGM sends a pairing request to the smartphone, which prompts the Player. The Player responds by keying in the Player PIN associated with his anonymous player record on either the smartphone or the EGM (FIG. 8). If the Player enters the Player PIN on the EGM, no secondary verification is required. In the situation where the Player enters the PIN on the smartphone, a secondary verification may be performed to ensure that the playing session is established at the correct EGM. This may be achieved by displaying a number on the EGM that is then entered on the smartphone by the Player. Alternately, the Player may use the smartphone application to identify the EGM through QR code scanning, as described above with respect to FIG. 6.

In accordance with some embodiments, the system may detect multiple players at the EGM. In this scenario, several players are close to the EGM and have their smartphones within the card-in area. To ensure that the intended card-in happens, the EGM displays a list of the multiple potential players on its screen or iView display. For example, the EGM may display a message such as: "Multiple smartphones detected. Are you Username 1? John Smith? Username 3?" In this example, the anonymous usernames or actual player names (for qualified players) are obtained by using the detected BDDRs to look up player records in the database. When the Player selects his username, card-in occurs and a play session is established for the Player.

Figure 17:
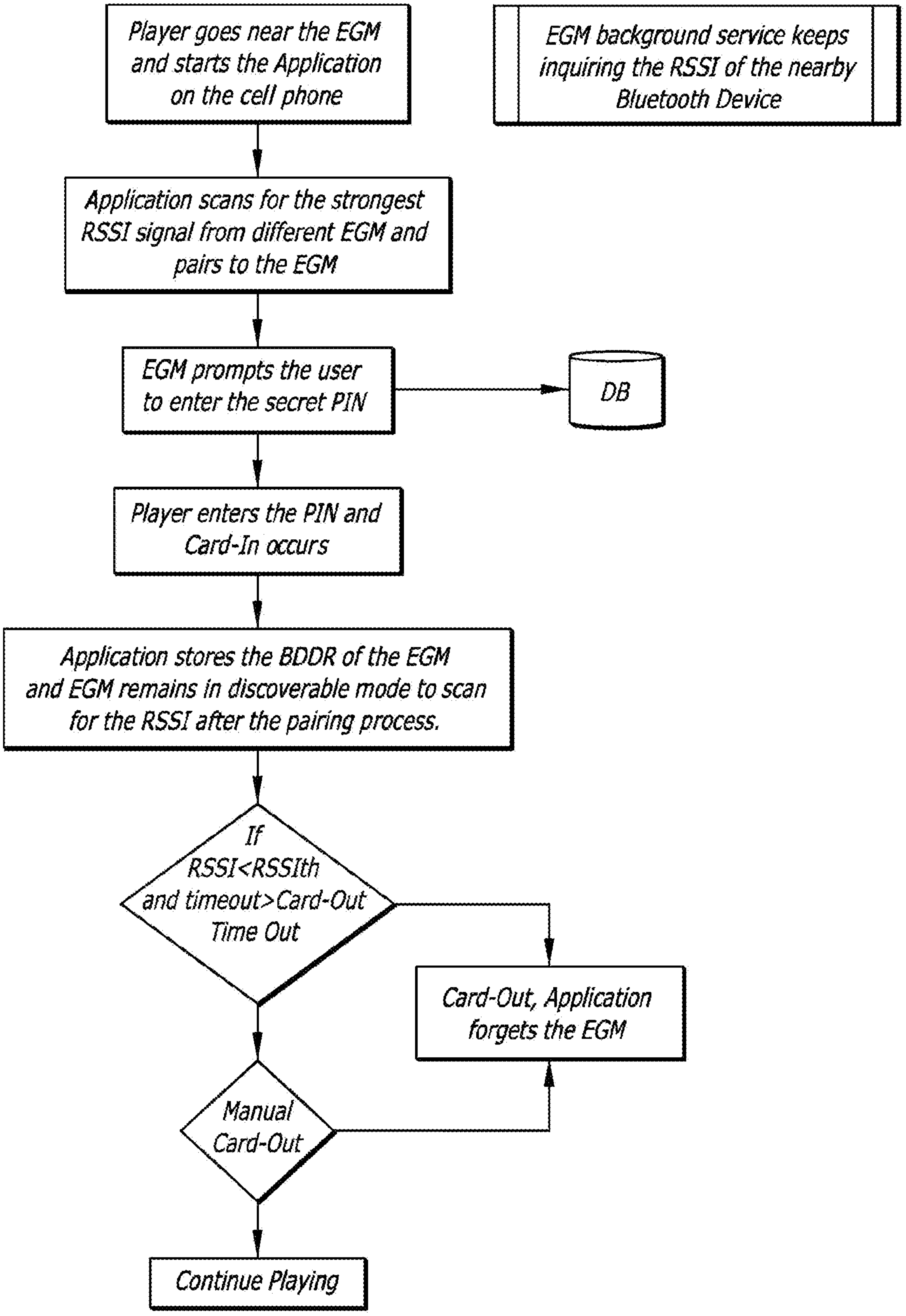
FIG. 17 illustrates a logic diagram with the smartphone as the master and the EGM as the slave in accordance with one or more embodiments.

Referring now to FIG. 17, an embodiment is shown with the smartphone as the master device and the EGM as the slave device in discoverable mode. One positive feature of using this approach is that this configuration is more secure because the smartphone does not need to be in discoverable mode all the time. The main drawback of using this scenario is that the smartphone application is more complex. As above, the smartphone has been registered with the casino and the mobile application is installed and running on the smartphone, Bluetooth is enabled, etc. In this embodiment, the card-in process begins when the Player walks up to the EGM (FIG. 7). The mobile application scans for nearby electronic gaming machines and the EGM responds with its BDDR. The mobile application waits for a steady and constant signal from the EGM for a predetermined period. Next, the mobile application sends a pairing request. Upon receiving the pairing request, the EGM asks the Player to enter their PIN. The Player enters the PIN, and, upon successful authentication by the EGM, is carded-in at the EGM (FIG. 8).

Figure 18:
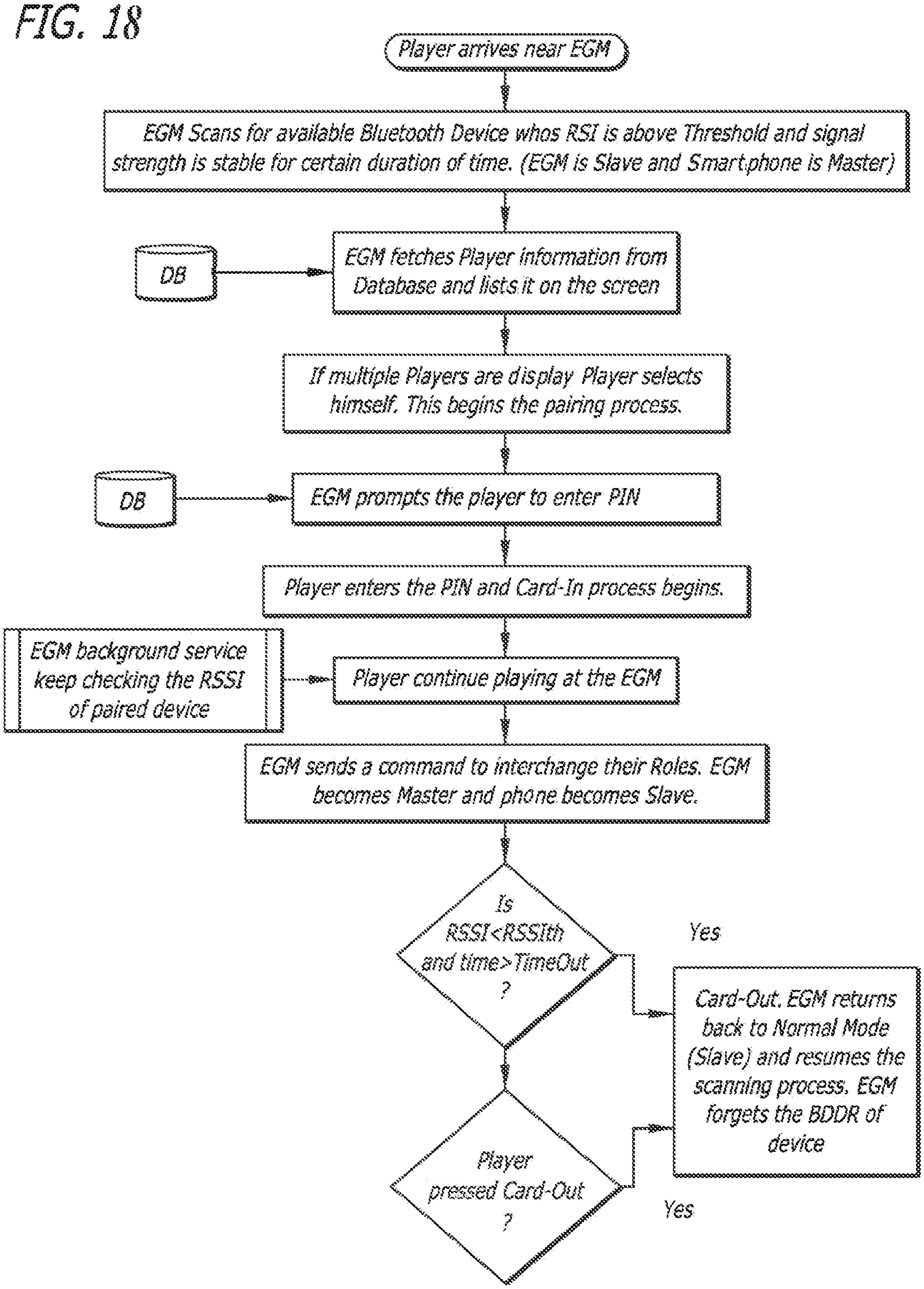
FIG. 18 illustrates a logic diagram with the EGM and the smartphone in a role interchangeable mode in accordance with one or more embodiments.

FIG. 18, in accordance with still other embodiments, illustrates a combination of the embodiments previously described. The EGM starts out in slave mode and is discoverable, the smartphone is in master mode. When card-in is complete, the EGM and the smartphone interchange their master/slave roles. The main positive features of using this approach are that (1) this configuration is more secure since the smartphone does not need to be in discoverable mode all the time and (2) the smartphone's battery charge is conserved.

Figure 10:
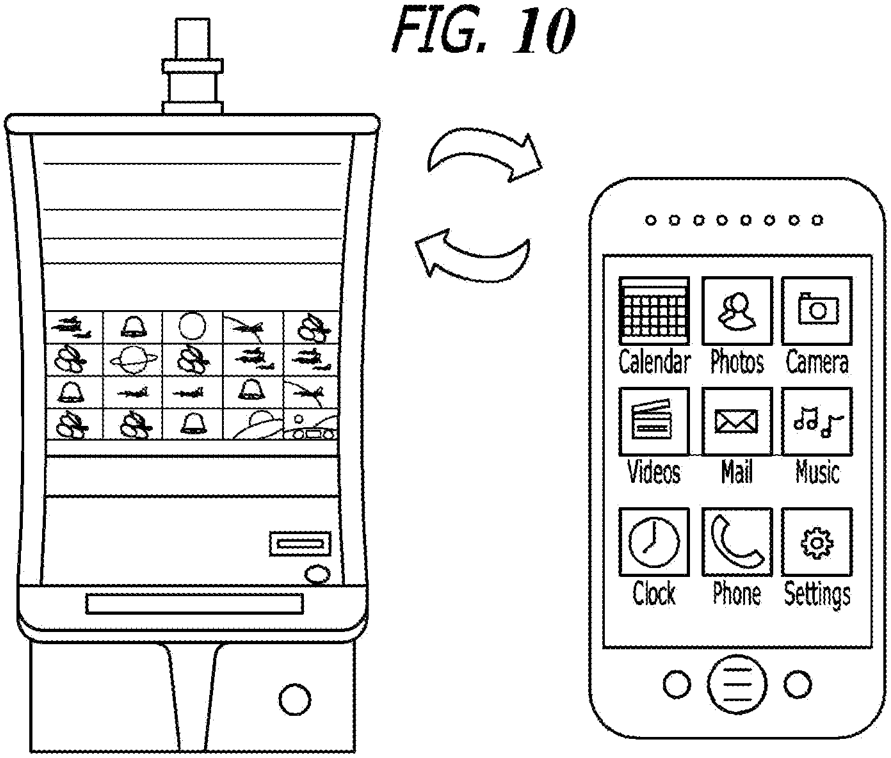
FIG. 10 illustrates a front perspective view of an EGM and a smartphone during game play in accordance with one or more embodiments.
Figure 11:
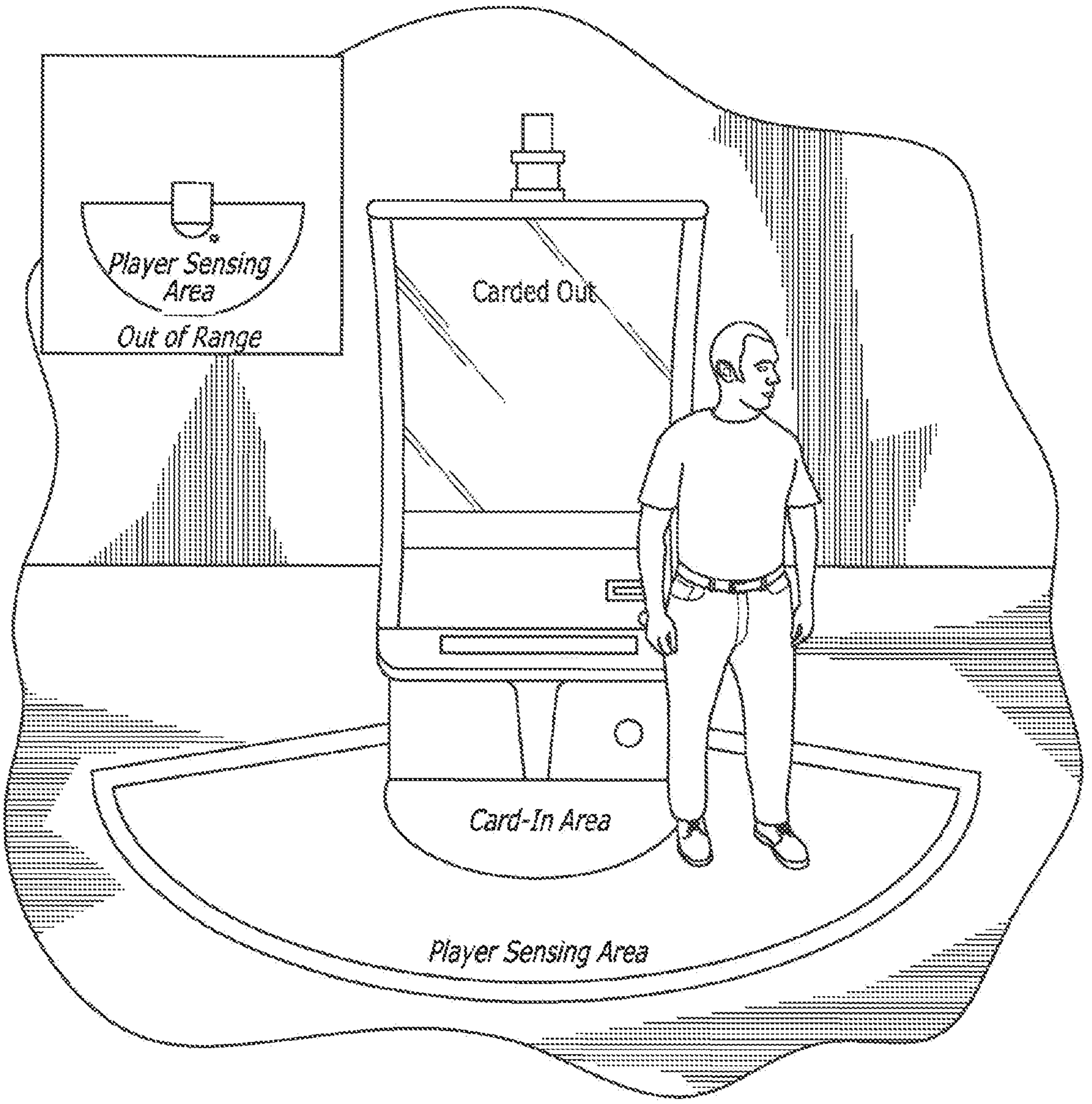
FIG. 11 illustrates a front perspective view of the player-sensing area and card-in area around an EGM with a player carding-out in accordance with one or more embodiments.

Referring to FIG. 10, in accordance with one or more embodiments, after one of the above card-in processes has been completed, the Player's game play is tracked until the Player cards out. While the Player may explicitly card-out via a card-out button on the EGM or in the mobile application, the system also provides for automatic card-out. During the card-in process, the RSSI threshold value was set high enough that only intentional card-in events could happen. However, once card-in is complete, the Player may wish to put the smartphone in their pocket or purse while playing. Accordingly, the RSSI threshold may be lowered during game play so that the Player does not have to be keep the smartphone unnecessarily close to the EGM. This practice may be thought of as "restrictive card-in but lenient card-out." Once the RSSI threshold is lowered during game play, the RSSI value of the signal received from the smartphone is periodically checked. This RSSI value is compared to the new lower threshold. If the RSSI value exceeds the new threshold, periodically polled BDDR addresses are compared with the value of the BDDR obtained while carding-in. This comparison is performed to ensure that the Player is still at the EGM. If the RSSI value is less than the new threshold or a non-matching BDDR response is received, the Player is automatically carded out. In accordance with some embodiments, the system may also enable low-level Bluetooth communication between the smartphone and the EGM once the devices are paired. The EGM may then send a periodic "handshake" or a "keep-alive" signal to the smartphone using, for example, the RFComm protocol, which is essentially an emulated serial port communication. If a keep alive response from the smartphone is not received by the EGM within a predetermined timeout period, the Player is carded out. Thus, as illustrated by FIG. 10, the Player may card out by simply walking away from the EGM. Any card out event transfers any remaining credits on the game to the Player's mobile wallet, as described below.

In accordance with still other embodiments, automatic card-out may be accomplished or supported by biometric data acquired by other EGM-based systems such as a camera or thermal imaging device. A method for verifying the continued presence of the Player at the EGM during a play session includes activating the play session (as described in various embodiments above) and obtaining a first biometric verification data sample from the Player. A second biometric verification data sample is obtained during the play session and is analyzed in view of the first verification data sample. The analysis comprises determining whether the second biometric verification data sample is substantially like the first biometric verification data sample. If the second biometric verification data sample is substantially like the first biometric verification data sample, the system concludes that the Player continues to be present at the EGM, and the system continues to obtain verification data samples. Thereafter, the most recently obtained biometric verification data sample is analyzed in view of the immediately previous obtained biometric verification data sample to determine whether the most recently obtained biometric verification data sample is substantially like the previously obtained biometric verification data sample. Further details related to EGM-based capture of biometric data for the purposes of continuing or terminating a playing session, including hardware and software details of systems capable of supporting such embodiments, are included in U.S. Pat. No. 8,047,914, entitled "PLAYER VERIFICATION SYSTEM," fully incorporated herein by explicit reference.

Figure 12:
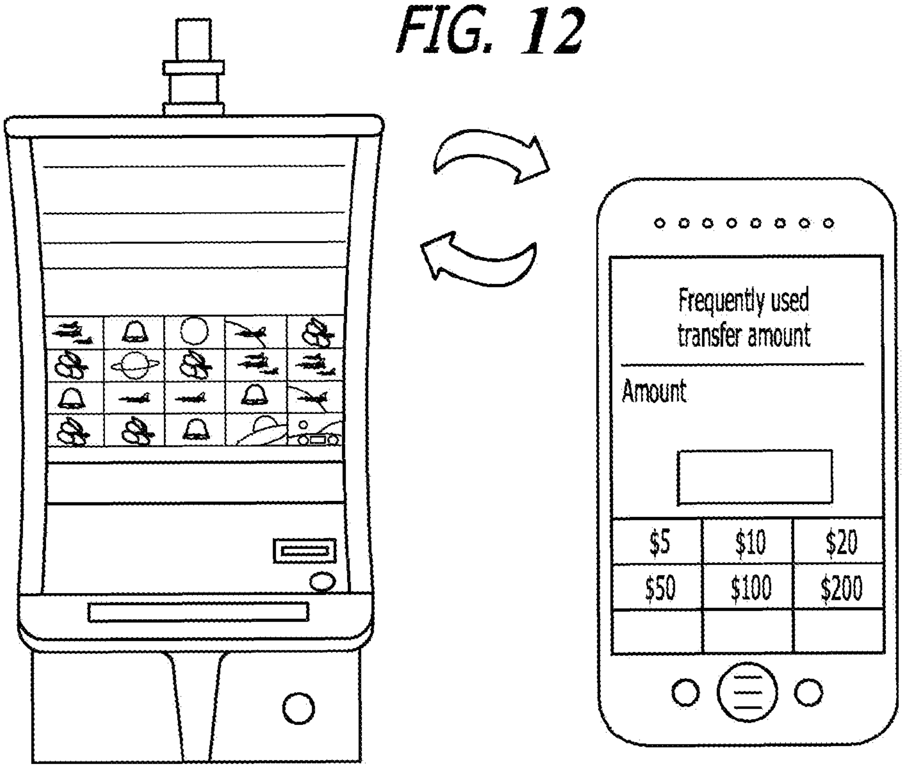
FIG. 12 illustrates a front perspective view of an EGM and a smartphone during a funds transfer process in accordance with one or more embodiments.
Figure 13:
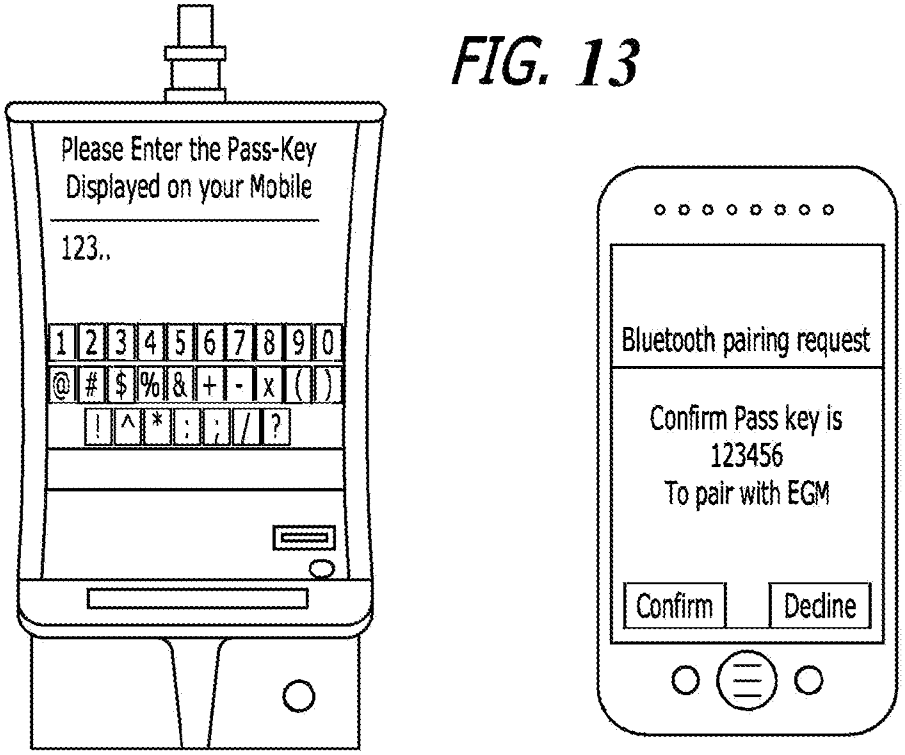
FIG. 13 illustrates a front perspective view of an EGM and a smartphone during the funds transfer process with the EGM displaying a prompt for pass-key and the smartphone displaying the passkey in accordance with one or more embodiments.
Figure 14:
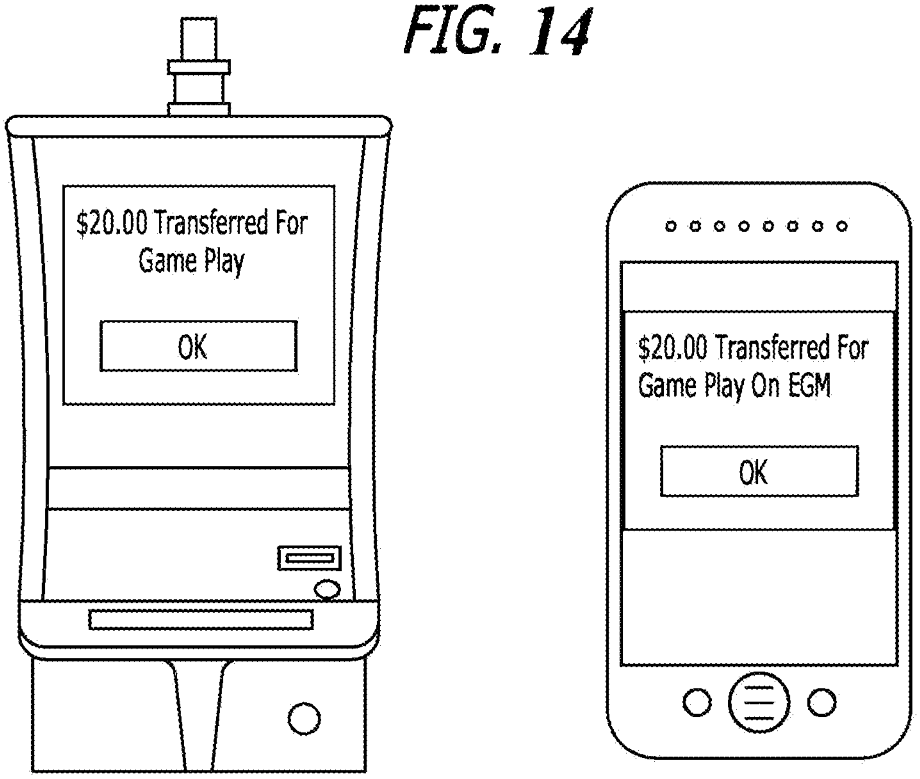
FIG. 14 illustrates a front perspective view of an EGM and a smartphone with the funds transfer process of FIGS. 11 and 12 completed.
Figure 15:
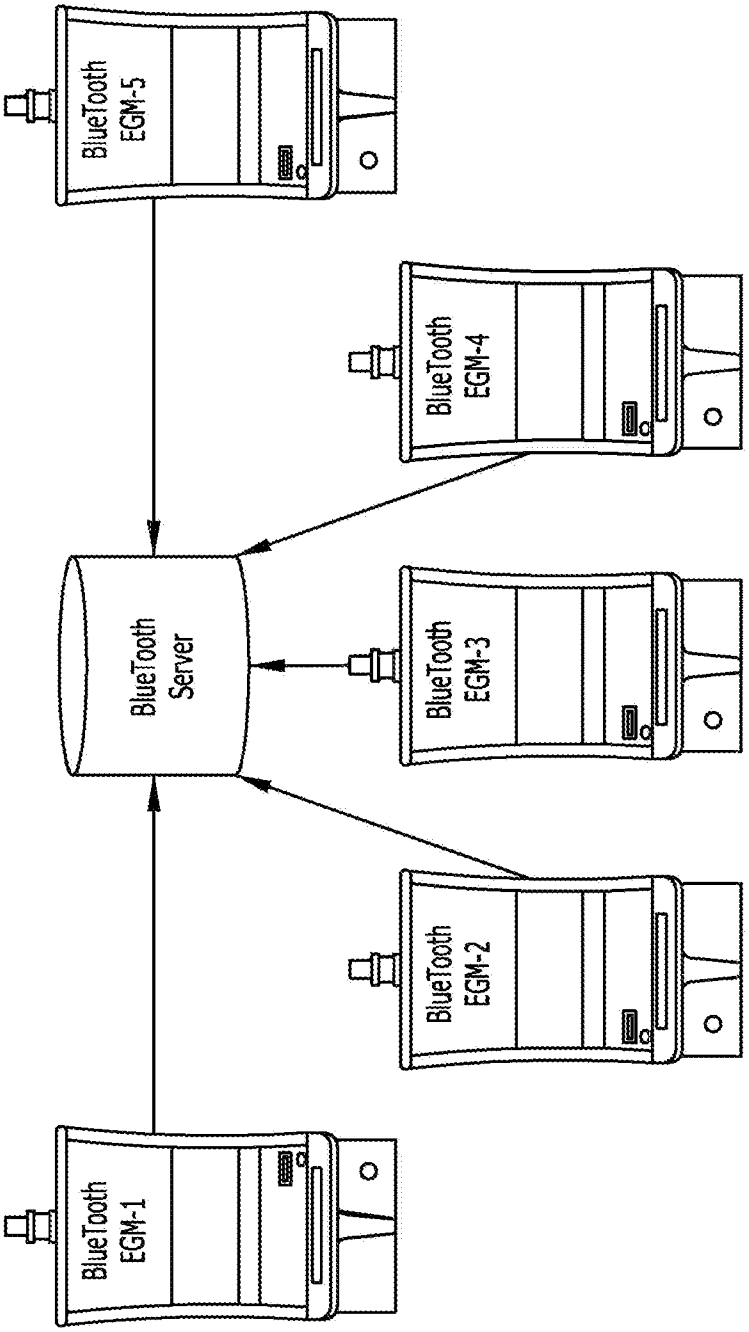
FIG. 15 illustrates a diagram of a wireless-enabled server and multiple wireless-enabled EGMs in use with a wireless-enabled player-sensing and card-in system in accordance with one or more embodiments.
Figure 19:
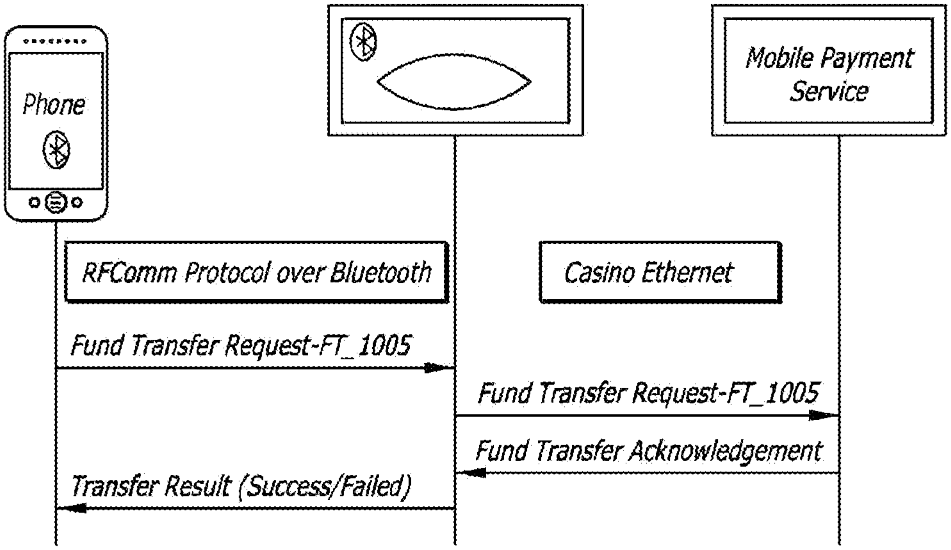
FIG. 19 illustrates a logic diagram with the funds transfer from the smartphone to the EGM/iView in accordance with one or more embodiments.

Referring to FIG. 19, mobile payment options may be extended to the Player in accordance with one or more embodiments. The Player may deposit cash at the cage against their mobile wallet and transfer it to the EGM for use. Typically, the Player may be required to pass an additional authentication procedure before the funds transfer can occur. As shown in FIG. 19, funds are transferred from the smartphone to the EGM. The Player first pairs the smartphone with the Bluetooth-enabled EGM, as above. Using the mobile application (e.g., SG Universe) or a separate e-wallet application on the smartphone (e.g., Unified Wallet), the Player selects the amount to be transferred (FIG. 12). Once the funds transfer is initiated, the mobile application asks the Player to authenticate himself with their PIN. The requested funds are then transferred to the EGM through the mobile application and a success or error message is displayed on the smartphone and on the EGM (FIG. 14). The iView (or other system interface device on the EGM) then sends the Player-entered amount to a casino mobile payment service. The mobile payment service authorizes the payment and sends the acknowledgement to iView. iView then uses an AFT (automatic funds transfer) request to transfer the funds to the EGM's credit meter. The iView also communicates the status of the funds transfer to the mobile application or e-wallet, which displays the funds transfer status and the current funds balance on the screen. Funds transfer from the smartphone to the EGM can happen multiple times while the Player is carded in. For increased security, the above process may be executed for each funds transfer request, with the Player entering their PIN each time.

Figure 20:
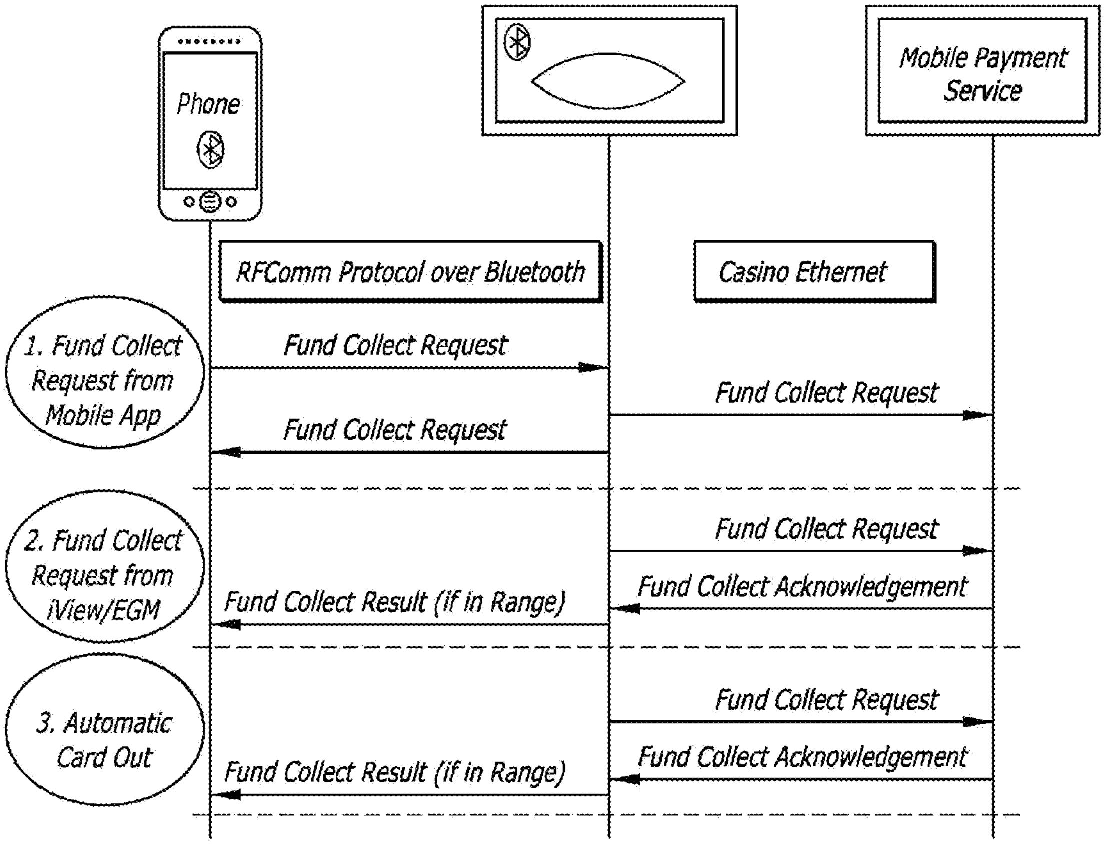
FIG. 20 illustrates a logic diagram with the funds transfer from the smartphone to the EGM/iView to the mobile wallet in accordance with one or more embodiments.

As shown in FIG. 20, in accordance with other embodiments, funds are instead transferred from the EGM to the smartphone to cash out credits on the EGM to the Player's mobile wallet. This can occur when the Player presses a "collect" button on either the Bluetooth-enabled EGM or the smartphone, when the Player presses a "card-out" button, or when the Player moves away from the EGM for more than a predetermined period or is otherwise automatically carded-out, as described above. This ensures that no other player can play with credits left on the EGM. Regardless of how the transfer was initiated, the iView client sends a "collect" message to the mobile payment service. The mobile payment service authorizes this request and sends an acknowledgement to the iView. The iView attempts to send the acknowledgement to the smartphone over Bluetooth. If the Player is close enough to the EGM, the mobile application receives the information and updates its screen accordingly. If, however, the Player has moved away from the EGM, iView cannot communicate over Bluetooth. In this case, the Player may later receive confirmation of the transfer of funds to their mobile wallet when carded-in again at another EGM, at a kiosk, etc.

Further details related to wireless pairing of the Player's smartphone and an EGM for the purposes of establishing a playing session, funds transfers to and from the EGM and the like, including hardware and software details of electronic gaming machines, player tracking systems, applications and systems capable of supporting the various embodiments described above, are included in U.S. Pat. Publication 2016/0093166A1, entitled "SYSTEM AND METHOD FOR WIRELESS CARD-IN AND CARD-OUT," fully incorporated herein by explicit reference.

The Player's mobile wallet may be under control of a digital unified wallet manager, which is a combined interface exposed by multiple services aggregated into a single virtual service. The unified wallet manager provides a secure, auditable, scalable gaming wallet capable of managing real money, with multiple currency support, bonus points or promotions, loyalty points, virtual credits, and play or virtual money for multiple vertical gaming systems, an example of which is Unified Wallet by SG Gaming, Inc. Further details related to unified digital wallets are included in U.S. Pat. No. 10,607,442, entitled "A UNIFIED DIGITAL WALLET," fully incorporated herein by explicit reference.

While the above embodiments have been primarily directed to the use of one or more cameras via which the Player provides biometric data for facial recognition, alternate embodiments employ other means of collecting voluntarily supplied biometric information about the Player. For example, the EGM may include a fingerprint sensor instead of, or in addition to, a camera. Similarly, the smartphone may include an integrated fingerprint sensor. One example employing such a sensor includes the Player logging into their SG Universe application using the Touch ID® subsystem of an Apple iPhone. Thus, it will be appreciated that the above concepts can also be used with all biometric input devices or combinations thereof.

While the example embodiments have been described with relation to a gaming environment, specifically a casino, it will also be appreciated that the above concepts can also be used in various other gaming environments. Accordingly, the disclosure should not be limited strictly to gaming casinos, but extended to arcades, portal-based game sites, social media game sites. As noted above, the EGM should be extended to include smartphone and tablet devices, personal digital assistant devices, laptops, personal computers, home game consoles, bar top gaming devices, table gaming devices, surface computing devices, television gaming, or in-room gaming devices.

One of ordinary skill in the art will appreciate that not all EGMs and gaming systems have all these components and may have other components in addition to, or in lieu of, those components mentioned here. Furthermore, while these components are viewed and described separately, various components may be integrated into a single unit in some embodiments.

The foregoing description, for purposes of explanation, uses specific nomenclature and formula to provide a thorough understanding of the disclosure. It should be apparent to those of skill in the art that the specific details are not required to practice the disclosure. The embodiments have been chosen and described to best explain the principles of the disclosure and its practical application, thereby enabling others of skill in the art to utilize the disclosure, and various embodiments with various modifications as are suited to the particular use contemplated. Thus, the foregoing disclosure is not intended to be exhaustive or to limit the disclosure to the precise forms disclosed, and those of skill in the art recognize that many modifications and variations are possible in view of the above teachings.

Each of these embodiments and obvious variations thereof is contemplated as falling within the spirit and scope of the claimed invention, which is set forth in the following claims. Moreover, the present concepts expressly include all combinations and sub combinations of the preceding elements and aspects.

What is claimed is:

1. A method of operating a casino gaming system, the casino gaming system comprising at least one electronic gaming machine operable to facilitate a wagering game, the at least one electronic gaming machine comprising a display, a first camera, a proximity sensor, and a controller operable to communicate with one or more servers via a network, the method comprising:

detecting, via the proximity sensor, presence of a player at the electronic gaming machine;

requesting, via the display, consent of the player to capture an image of the player with the first camera;

if the consent of the player is received, capturing the image of the player with the first camera and transmitting the image to at least one of the one or more servers via the network;

if the consent of the player is not received, capturing the image of the player with a second camera integrated into a portable electronic device of the player and transmitting the image of the player to the one or more servers via the network;

computing, by the one or more servers, a biometric signature of the player based on the captured image;

attempting to locate, by the one or more servers using the biometric signature, an anonymous player record in a database stored on the one or more servers, the anonymous player record including historical play information associated with the player, wherein the anonymous player record does not include details identifying the player;

establishing, via the controller, a play session associating the anonymous player record with the at least one electronic gaming machine; and updating the anonymous player record in the database to incorporate game play data collected by the controller during the play session into the anonymous player record.

2. The method of claim 1, further comprising creating a new player record in the database if the attempt to locate the anonymous player record in the database fails, wherein the new player record is identified by the biometric signature and does not include details identifying the player, and wherein the new player record becomes the anonymous player record.

3. The method of claim 1, wherein the details identifying the player include at least one of the player's name or the player's address.

4. The method of claim 1, further comprising screening the player record, by the one or more servers, against certain criteria before allowing establishment of the play session.

5. The method of claim 1, wherein capturing the image of the player with the second camera is performed by a browser based mobile application running on the portable electronic device.

6. The method of claim 5, wherein the browser-based mobile application is invoked via scanning of a QR code with the second camera.

7. The method of claim 1, wherein capturing the image of the player with the second camera is performed by a mobile application installed on the portable electronic device.

8. The method of claim 7, wherein the mobile application is installed on the portable electronic device via scanning of a QR code with the second camera.

9. The method of claim 7, wherein establishing the play session comprises identifying the electronic gaming machine to the system by scanning, via the second camera and the installed mobile application, a QR code displayed by or at the electronic gaming machine.

10. The method of claim 1, wherein the proximity sensor comprises a Bluetooth receiver.

11. The method of claim 10, wherein establishing the play session comprises pairing the portable electronic device with the electronic gaming machine via Bluetooth.

12. The method of claim 1, wherein the proximity sensor comprises a passive infrared sensor.

* * * * *